(12) United States Patent
Adachi

(10) Patent No.: US 12,106,869 B2
(45) Date of Patent: Oct. 1, 2024

(54) BUSBAR ASSEMBLY AND METHOD FOR MANUFACTURING THE SAME

(71) Applicant: Suncall Corporation, Kyoto (JP)

(72) Inventor: Yuusuke Adachi, Kyoto (JP)

(73) Assignee: Suncall Corporation, Kyoto (JP)

( * ) Notice: Subject to any disclaimer, the term of this patent is extended or adjusted under 35 U.S.C. 154(b) by 260 days.

(21) Appl. No.: 17/764,086

(22) PCT Filed: Sep. 2, 2020

(86) PCT No.: PCT/JP2020/033212
§ 371 (c)(1),
(2) Date: Mar. 25, 2022

(87) PCT Pub. No.: WO2021/059904
PCT Pub. Date: Apr. 1, 2021

(65) Prior Publication Data
US 2022/0359101 A1 Nov. 10, 2022

(30) Foreign Application Priority Data
Sep. 27, 2019 (JP) .................................. 2019-177285

(51) Int. Cl.
*H01B 5/02* (2006.01)
*B23K 26/0622* (2014.01)
(Continued)

(52) U.S. Cl.
CPC ........... *H01B 5/02* (2013.01); *B23K 26/0622* (2015.10); *B23K 26/38* (2013.01); *H01B 13/0036* (2013.01)

(58) Field of Classification Search
None
See application file for complete search history.

(56) References Cited

U.S. PATENT DOCUMENTS 4,517,406 A * 5/1985 Erdle ..................... H02G 5/005
174/72 B
5,517,756 A * 5/1996 Shirai ................. H01L 23/5386
174/253
(Continued)

FOREIGN PATENT DOCUMENTS

JP 02-41478 U 3/1990
JP H04-354398 A 12/1992
(Continued)

OTHER PUBLICATIONS

International Search Report issued in PCT/JP2020/033212, mailed Oct. 27, 2020, 6 pages.

*Primary Examiner* — Krystal Robinson
(74) *Attorney, Agent, or Firm* — Sterne, Kessler, Goldstein & Fox P.L.L.C.

(57) ABSTRACT

A busbar assembly of the present invention includes first and second busbars disposed in parallel in a common plane with a gap therebetween, and an insulating resin layer including a gap filling part and an upper surface laminated part, the upper surface laminated part having a first busbar-side upper surface opening that exposes a predetermined area of the upper surfaces of the first busbar and the gap filling part that straddles a boundary therebetween, and a second busbar-side upper surface opening that exposes a predetermined area of the upper surfaces of the second busbar and the gap filling part that straddles a boundary therebetween, a part of the upper surface laminated part between the first and second busbar-side upper surface openings forming a partitioning wall.

10 Claims, 21 Drawing Sheets

(51) Int. Cl.
*B23K 26/38* (2014.01)
*H01B 13/00* (2006.01)

(56) References Cited

U.S. PATENT DOCUMENTS

| | | |
|---|---|---|
| 10,784,669 B2 | 9/2020 | Wakabayashi et al. |
| 10,907,268 B2 | 2/2021 | Nakagawa et al. |
| 11,127,672 B2 * | 9/2021 | Nakagawa ............. H05K 1/056 |

FOREIGN PATENT DOCUMENTS

| | | | |
|---|---|---|---|
| JP | 2010-031216 A | 2/2010 |
| JP | 4432913 B2 | 3/2010 |
| JP | 2012-096286 A | 5/2012 |
| JP | 2019-042678 A | 3/2019 |
| JP | 2019-050090 A | 3/2019 |
| JP | 6487769 B2 | 3/2019 |

* cited by examiner

BUSBAR ASSEMBLY AND METHOD FOR MANUFACTURING THE SAME

FIELD OF THE INVENTION

The present invention relates to a busbar assembly in which first and second busbars are electrically insulated and mechanically connected to each other, and a method for manufacturing the same.

BACKGROUND ART

Busbar assemblies in which a plurality of busbars are mutually electrically insulated and mechanically connected are proposed, and are used in various fields.

For example, there are proposed laminated-type busbar assemblies in which a first flat plate busbar and another second flat plate busbar in parallel with each other are vertically laminated (see Patent Literatures 1 and 2 below).

In the laminated-type busbar assembly, the entirety of the opposing flat surface of the first flat plate busbar and the entirety of the opposing flat surface of the second flat plate busbar are disposed to face each other with an insulating resin therebetween, it is difficult to ensure sufficient reliability in electric insulating property.

In particular, if the insulating resin between the first and second flat plate busbars is made thin in order to downsize the busbar assembly in the vertical direction, there is a risk that a leakage current flows between the first and second busbars.

In order to solve the problems of the above laminated-type busbar assembly, the present applicant has filed applications for a planar-type busbar assembly in which first and second busbars of conductive metal flat plates are arranged in parallel in a common plane (see Patent Literatures 3 and 4 below).

FIG. 21A shows a plan view of an example of a planar-type busbar assembly 500.

FIG. 21B shows a cross-sectional view along the line XXI(b)-XXI(b) in FIG. 21A.

As shown in FIGS. 21A and 21B, the planar-type busbar assembly 500 has a first busbar 510(1) formed of a conductive metal flat plate, a second busbar 510(2) formed f a conductive metal flat plate and arranged in a common plane to the first busbar 510(1) with a gap 515 between the first busbar 510(1) and the second busbar 510(2), and an insulative resin layer 520 that mechanically connects the first and second busbars 510(1), 510(2) while electrically insulating them.

The insulative resin layer 520 has a gap filling part 525 filled in the gap 515, and a surface laminated part 530 laminated on a surface of a busbar connecting body where the first and second busbars 510(1), 510(2) are connected by the gap filling part 525.

The surface laminated part 530 includes an upper laminated part 530 and a lower laminated part 540 that cover an upper surface on one side in the thickness direction and a lower surface on the other side in the thickness direction of the busbar connecting body, respectively, and a side surface laminated part 550 that covers an outside surface of the busbar connecting body and connects the upper and lower laminated parts 530, 540.

The upper laminated part 530 has first and second openings 532(1), 532(2) that expose predetermined parts of the upper surfaces of the first and second busbars 510(1), 510(2), respectively, thereby to form first and second exposed areas.

FIG. 21C shows a vertical cross-sectional view of a semiconductor module 600 in which a semiconductor element 110 such as an LED is mounted on the busbar assembly 500.

As shown in FIG. 21C, the semiconductor element 110 has a first electrode layer (lower electrode layer) mechanically and electrically connected to one of the first and second exposed areas (in FIG. 21C, the first exposed area) via, for example, a plating layer (not shown), and a second electrode layer (upper electrode layer) electrically connected to the other of the first and second exposed areas (the second exposed area in FIG. 21C) via a wire bonding 120.

The planar busbar assembly 500 is useful in being able to be made small in the vertical direction, but has still room for improvement in terms of aggregate arrangement of semiconductor elements 110 to be mounted.

That is, the limit of the aggregate arrangement of the semiconductor elements 110 is defined by a spaced-apart width L2 between the opposing edges of the first and second openings 532 (1), 532(2) (see FIG. 21B); in the planar busbar assembly 500, the L2 is greater than or equal to the width L1 of the gap between the first and second busbars 510(1), 510(2).

In the planar busbar assembly 500 having the above configuration, it is necessary to narrow the gap width L1 in order to reduce the size of the L2; from the viewpoint of securing the insulating property between the first and second busbars 510(1), 510(2), however, there is a limit to narrowing of the width L1 of the gap.

PRIOR ART DOCUMENT

Patent Literature

Patent Literature 1: Japanese Patent No. 4432913
Patent Literature 2: Japanese Patent No. 6487769
Patent Literature 3: Japanese Unexamined Patent Application Publication No. 2019-042678
Patent Literature 4: Japanese Unexamined Patent Application Publication No. 2019-050090

SUMMARY OF THE INVENTION

The present invention has been made in view of the conventional art, and it is a first object of the present invention to provide a busbar assembly having first and second busbars that are arranged in a common plane with a gap present between each other and that are connected in an insulated state by an insulating resin layer including a gap filling part filled in the gap, the busbar assembly enabling an aggregate arrangement of semiconductor elements that are mounted on the first and/or second busbars, while maintaining a good insulating property between the first and second busbars.

Further, it is a second object of the present invention is to provide a manufacturing method that can efficiently manufacture the busbar assembly.

In order to achieve the first object, the present invention provides a busbar assembly including first and second busbars formed by a conductive flat plate member and disposed in a common plane with a gap provided therebetween; and an insulative resin layer including a gap filling part filled into the gap and an upper surface laminated part provided on an upper surface on one side in a plate thickness direction of a busbar connecting body in which the first and second busbars are connected to each other by the gap filling part, wherein the upper surface laminated part has a first busbar-side upper surface opening that exposes a predetermined area out of the upper surfaces of the first busbar and the gap filling part that straddles a boundary therebetween, and a second busbar-side upper surface opening that exposes a predetermined area out of the upper surfaces of the second busbar and the gap filling part that straddles a boundary therebetween, and a part of the upper surface laminated part that is positioned between the first and second busbar-side upper surface openings forms a partitioning wall.

The busbar assembly according to the present invention makes it possible to realize an aggregate arrangement of semiconductor elements that are mounted on the first and/or second busbars, while maintaining a good insulating property between the first and second busbars that are arranged in the common plane with the gap provided therebetween.

In a preferable embodiment, the first and second busbar-side upper surface openings are positioned in the center of the first and second busbars with respect to a longitudinal direction of the gap.

In one embodiment, the insulating resin layer has a lower surface laminated part provided on a lower surface on the other side of the busbar connecting body in the thickness direction, and a side surface laminated part provided on a side surface of the busbar connecting body and connecting peripheral edges of the upper surface laminated part and the lower surface laminated part. The lower surface laminated part has a lower surface opening that exposes a predetermined area of the lower surfaces of the first and second busbars.

The first and second busbars each have the upper surface, a lower surface on the other side in the thickness direction, a first side surface that faces the gap, a second side surface that turns to the opposite side of the gap, a third side surface that connects end portions of the upper surface, the lower surface, the first side surface and the second side surface that are positioned on one side of the gap in the longitudinal direction, and a fourth side surface that connects end portions of the upper surface, the lower surface, the first side surface and the second side surface that are positioned on the other side of the gap in the longitudinal direction.

In another embodiment, the first side surface is configured to have an upper surface adjacent section that extends from the upper surface to the other side in the thickness direction, a step section that extends, from an end portion of the upper surface adjacent section that is positioned on the other side in the thickness direction, in a direction proximate to the second side surface, and a lower adjacent section that extends, from an end portion of the step section that is positioned on a side proximate to the second side surface, to the other side in the thickness direction to reach the lower surface. The second side surface is configured to have an upper surface adjacent section that extends from the upper surface to the other side in the thickness direction, a step section that extends, from an end portion of upper surface adjacent section that is positioned on the other side in the thickness direction, in a direction proximate to the first side surface, and a lower surface adjacent section that extends, from an end portion of the step section that is positioned on a side proximate to the first side surface, to the other side in the thickness direction to reach the lower surface.

In this case, the insulating resin layer is configured to have a side surface laminated part integrally formed with the upper surface laminated part in such a manner as to cover the side surface of the busbar connecting body while exposing the lower surfaces of the first and second busbars.

The busbar assembly according to the present invention may further include a frame that includes a frame body and an insulating resin layer, the frame body having an outer peripheral shape, in plan view, corresponding to an outer peripheral shape of the busbar connecting body and having, at a center in plan view, a central hole that encloses the first and second busbar-side upper surface openings, the insulating resin layer covering an outer surface of the frame body.

The frame is fixed to a periphery area of the upper surface of the busbar connecting body in such a manner as to enclose, in plan view, the first and second busbar-side upper surface openings.

In order to achieve the second object, the present invention provides a method for manufacturing a busbar assembly including first and second busbars formed by a conductive flat plate member and disposed in a common plane with a gap provided between adjacent busbars, and an insulating resin layer including a gap filling part filled into the gap and an upper surface laminated part provided on an upper surface on one side in a plate thickness direction of a busbar connecting body in which the first and second busbars are connected to each other by the gap filling part, wherein the upper surface laminated part has a first busbar-side upper surface opening that exposes a predetermined area out of the upper surfaces of the first busbar and the gap filling part that straddles a boundary therebetween, and a second busbar-side upper surface opening that exposes a predetermined area out of the upper surfaces of the second busbar and the gap filling part that straddles a boundary therebetween, and a part of the upper surface laminated part that is positioned between the first and second busbar-side upper surface openings forms a partitioning wall, the method including: a process of preparing a busbar-directed conductive metal flat plate having a busbar assembly forming area that forms the first and second busbars; a slit forming process of forming, in the busbar assembly forming area, a slit penetrating between an upper surface on one side and a lower surface on the other side in the thickness direction and having a width same as the gap so as to define first and second busbar forming sites corresponding to the first and second busbars; a process of providing an insulative resin material in the slit and on an entirety of the upper surface of the busbar assembly forming area; a process of curing the insulative resin material to form the insulating resin layer including the gap filling part and the upper surface laminated part; a laser beam irradiating process of irradiating a laser beam to areas out of the upper surface of the upper surface laminated part that correspond to the first and second busbar-side upper surface openings to form the first and second busbar-side upper surface openings; and a cutting process of cutting the busbar assembly forming area from the busbar-directed conductive metal flat plate, wherein the laser beam irradiating process is configured to repeat a laser irradiating operation several times, the laser irradiating operation including a large pulse width laser irradiating operation in which the entirety of the corresponding area is irradiated with a large pulse width laser and a small pulse width laser irradiating operation in which the entirety of the corresponding area is irradiated with a small pulse width laser.

The manufacturing method according to the present invention makes it possible to efficiently manufacture the busbar assembly that enables an aggregate arrangement of semiconductor elements that are mounted on the first and/or second busbars, while maintaining a good insulating property between the first and second busbars that are arranged in the common plane with the gap provided therebetween.

In a preferable embodiment, the busbar-directed conductive metal flat plate is configured to integrally have a plurality of the busbar assembly forming areas arranged in series in a first direction along a longitudinal direction of the slit, and connecting areas connecting between adjacent busbar assembly forming areas.

In this case, the slit formed in one busbar assembly forming area is configured to have one side in the longitudinal direction extending into one connecting area connected to the one side in the first direction of the one busbar assembly forming area, and another side in the longitudinal direction extending into another connecting area connected to another side in the first direction of the one busbar assembly forming area.

The method for manufacturing the busbar assembly according to the present invention may further include a process of preparing a frame-directed conductive metal flat plate that includes a frame forming area having an outer peripheral shape, in plan view, corresponding to the busbar assembly forming area; a process of forming, in the frame forming area, a central hole that encloses, in plan view, the first and second busbar-side upper surface openings to form a frame body forming site; a process of applying an insulating resin material to an outer surface of the frame body forming site; a process of curing the insulating resin material to form an insulating resin layer enclosing the outer surface of the frame body forming site; and a metal flat plate fixing process of fixing the frame-directed conductive metal flat plate to the busbar-directed conductive metal flat plate in a state where the frame-directed conductive metal flat plate is overlapped with the busbar-directed conductive metal flat plate.

In this case, wherein cutting process is performed after metal flat plate fixing process.

BRIEF DESCRIPTION OF THE DRAWINGS

FIG. is an enlarged view of the part XVI(a) in FIG. 15.

EMBODIMENT FOR CARRYING OUT THE INVENTION

One embodiment of a busbar assembly according to the present invention will be described below with reference to the accompanying drawings.

Figure 1:
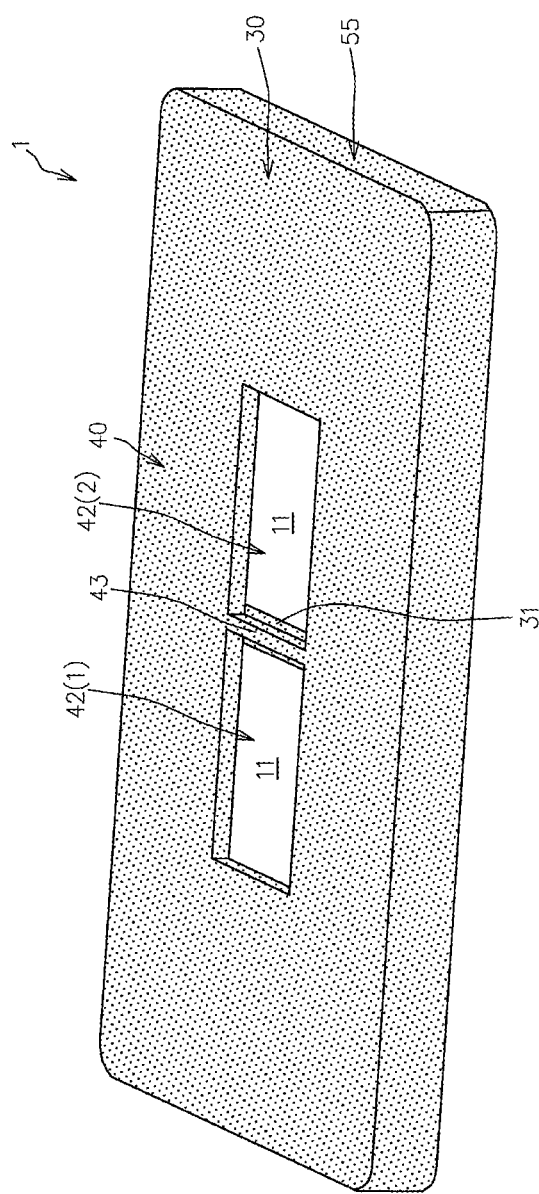
FIG. 1 is a perspective view, of a busbar assembly according to one embodiment of the present invention.
Figure 2:
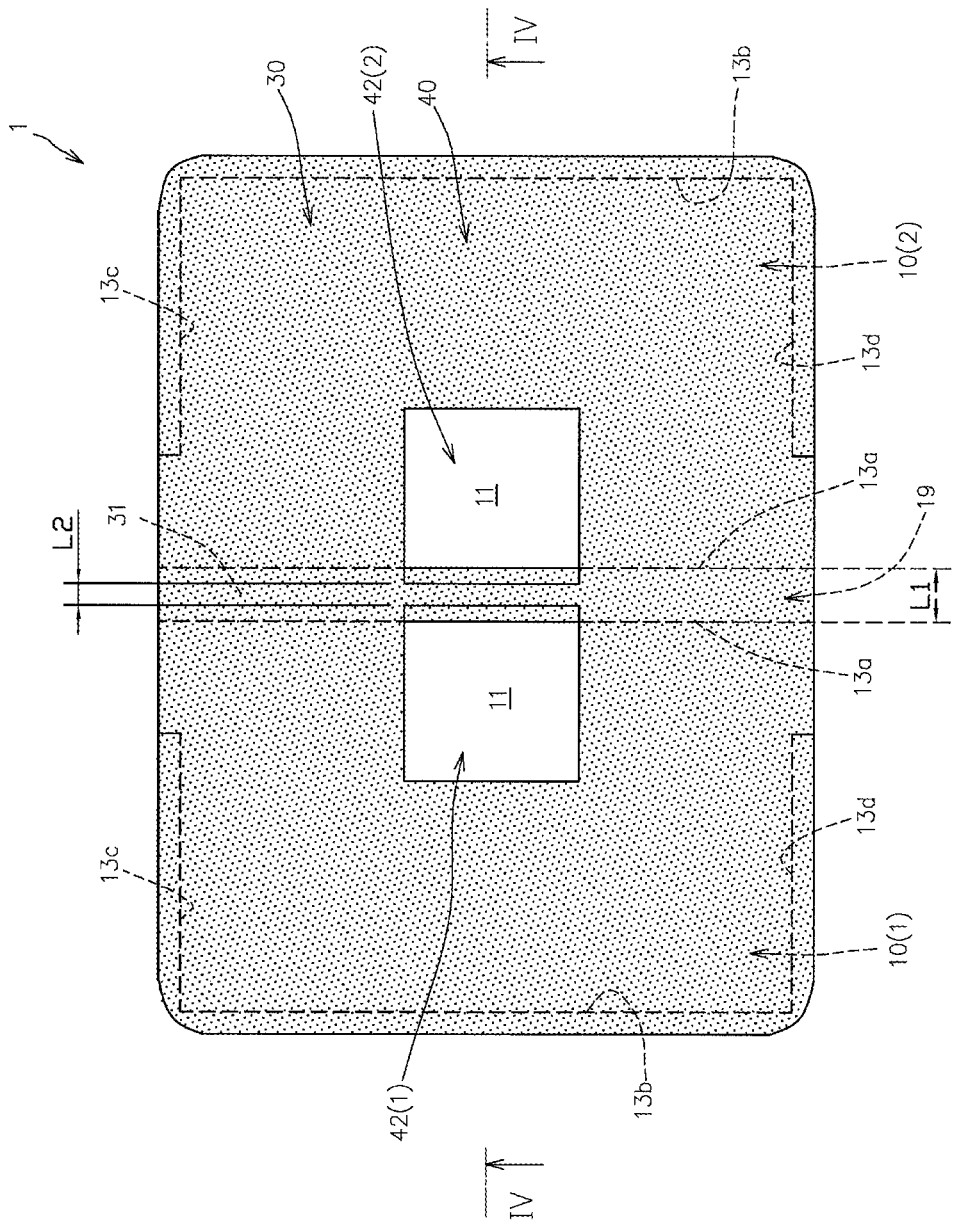
FIG. 2 is a plan view of the busbar assembly according to the embodiment.
Figure 3:
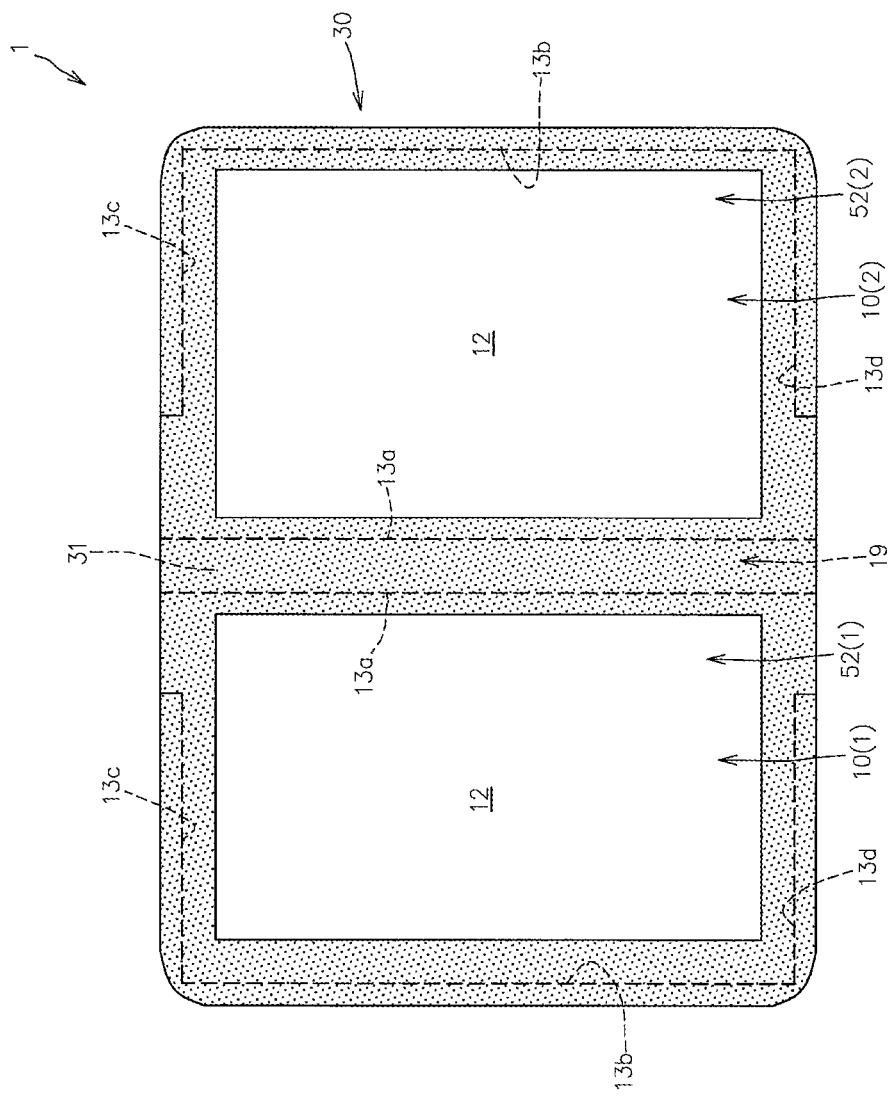
FIG. 3 is a bottom view of the busbar assembly according to the embodiment.

FIGS. 1 to 3 show a perspective view, a plan view, and a bottom view of a busbar assembly 1 according to the present embodiment, respectively.

Figure 4:
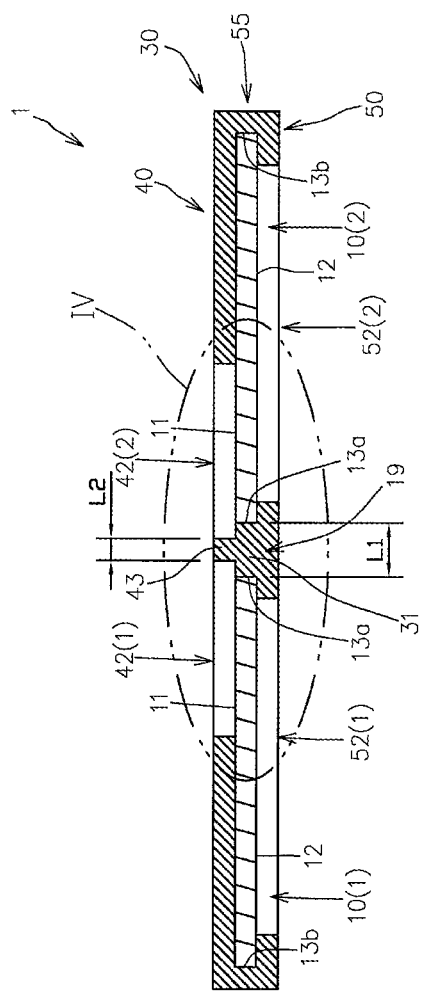
FIG. 4 is a vertical front view along the line IV-IV in FIG. 2.
Figure 5:
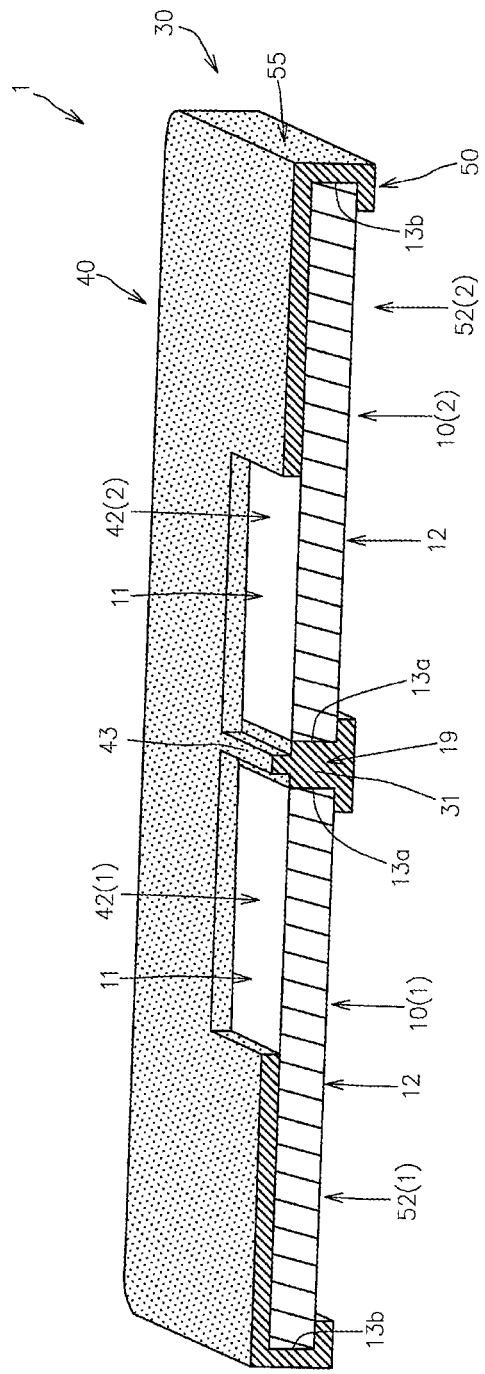
FIG. 5 is a vertical perspective view along the line IV-IV in FIG. 2.

FIGS. 4 and 5 show a vertical front view and a vertical perspective view along the line IV-IV in FIG. 2, respectively.

Figure 6:
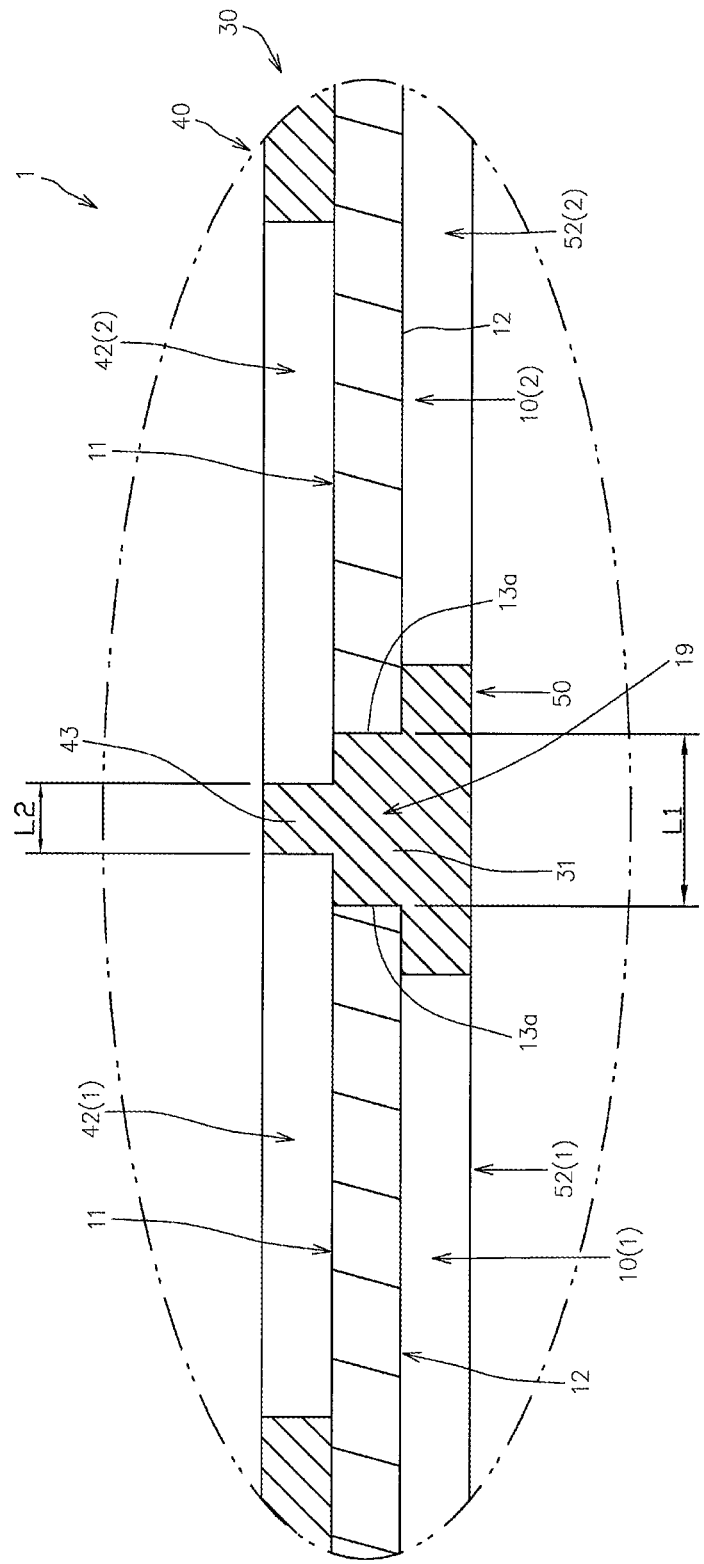
FIG. 6 is an enlarged view of the part VI in FIG. 4.

Further, FIG. 6 shows an enlarged view of the part VI in FIG. 4.

As shown in FIGS. 1 to 6, the busbar assembly 1 has first and second busbars 10(1), 10(2) that are formed by conductive flat plate members and arranged in a common plane in a state of a gap 19 being present between respective side surfaces facing each other, and an insulating resin layer 30 fixed to the first and second busbars 10(1), 10(2).

The busbar assembly 1 has only two busbars, that is, the first and second busbars 10(1), 10(2), but of course, the busbar assembly according to the present invention can have three or more busbars including the first and second busbars 10(1), 10(2).

The first and second busbars 10(1), 10(2) are formed by conductive metals such as Cu.

As shown in FIGS. 4 to 6, the first and second busbars 10(1), 10(2) each have an upper surface 11 on one side in a thickness direction, a lower surface 12 on the other side in the thickness direction, a first side surface 13a that faces the gap 1, a second side surface 13b that turns to the opposite side of the gap 19, a third side surface 13c that connects end portions of the upper surface 11, the lower surface 12, the first side surface 13a and the second side surface 13b that are positioned on one side of the gap 19 in the longitudinal direction, and a fourth side surface 13d that connects end portions of the upper surface 11, the lower surface 12, the first side surface 13a and the second side surface 13b that are positioned on the other side of the gap 19 in the longitudinal direction.

As shown in FIGS. 1 to 6, the insulating resin layer 30 has a gap filling part 31 that is filled in the gap 19 between opposing side surfaces 13a of the first and second busbars 10(1), 10(2) and that, in a state of being electrically insulated, mechanically connects the first and second busbars 10(1), 10(2), and an upper surface laminated part 40 provided on an upper surface of a busbar connecting body where the first and second busbars 10(1), 10(2) are connected by the gap filling part 31.

The insulating resin layer 30 is formed by an insulating resin material having a heat resistance property and an insulating property.

For example, INSULEED (registered trademark) is preferably used as the insulating resin material.

The upper surface laminated part 40 has first and second busbar-side upper surface openings 42(1), 42(2) to expose a part of the upper surfaces 11 of the first and second busbars 10(1), 10(2), respectively.

As shown in FIGS. 1 to 2 and FIGS. 4 to 6, the first busbar-side upper surface opening 42(1) is formed so as to expose a predetermined area out of the upper surface 11 of the first busbar 10(1) and an upper surface of the gap filling part 31 that straddles a boundary therebetween.

A space formed by the first busbar-side upper surface opening 42(1) acts as a semiconductor element mounting space for mounting the semiconductor element 110 (see FIGS. 7A and 7B below) on the first busbar 10(1) or an electrical connection space for electrically connecting the first busbar 10(1) to any other electrical connection member.

The second busbar-side upper surface opening 42(2) is formed so as to expose a predetermined area out of the upper surface 11 of the second busbar 10(2) and the upper surface of the gap filling part 31 that straddles a boundary therebetween, while retaining a part of the upper surface laminated part 40 between the first busbar-side upper surface opening 42(1) and the second busbar-side upper surface opening 42(2).

The second busbar-side upper surface opening 42(2) acts as a semiconductor element mounting space for mounting the semiconductor element 110 (see FIGS. 7A and 7B below) on the second busbar 10(2) or as an electrical connection space for electrically connecting the second busbar 10(2) to any other electrical connection member.

Figure 7A:
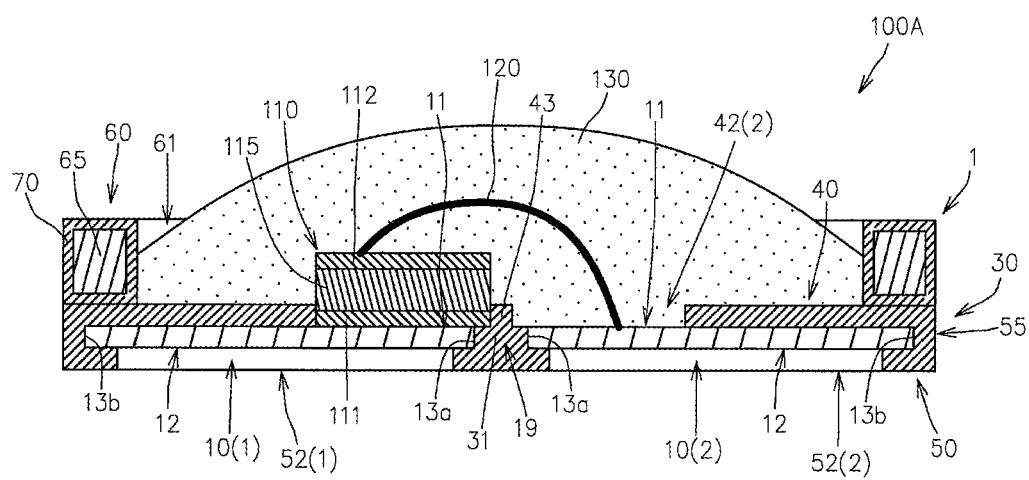
FIGS. 7A and 7B are vertical cross-sectional views of one example and another example, respectively, of a semiconductor module in which a semiconductor element is mounted on the busbar assembly according to the embodiment.

FIG. 7A shows a vertical cross-sectional view of one example of a semiconductor module 100A in which the semiconductor element 110 such as an LED is mounted on the busbar assembly 1.

In the semiconductor module 100A, the space formed by the first busbar-side upper surface opening 42(1) (see FIG. 4, FIG. 5, and the like) is used as the semiconductor element mounting space to mount the semiconductor element 110, and the space formed by the second busbar-side upper surface opening 42(2) is used as the electrical connection space.

In this case, one of the first and second busbars 10(1), 10(2) acts as a positive side electrode, and the other thereof acts as a negative side electrode.

That is, as shown in FIG. 7A, the semiconductor element 110 has first and second electrode layers 111, 112 on the lower surface on one side in the thickness direction and on the upper surface on the other side in the thickness direction, respectively, and an element body 115 between the first and second electrode layers 111 and 112.

In the semiconductor module 100A, the semiconductor element 110 is fixed to the upper surface 11 of one of the busbars (the first busbar 10(1) in the example shown in the figure) using the space formed by the corresponding upper surface opening (the first busbar-side upper surface opening 42(1) in the example shown in the figure (see FIG. 4, FIG. 5, and the like)), in a state where the semiconductor element 110 is electrically connected to a portion of the upper surface 11 of one busbar (the first busbar 10(1) in the example shown in the figure) that is exposed by the corresponding upper surface opening (the first busbar-side upper surface opening 42(1) in the example shown in the figure (see FIG. 4, FIG. 5, and the like)).

The second electrode layer 112 of the semiconductor element 110 is connected, via an electrical connection member 120 such as wire bonding, to a portion of the upper surface 11 of the other busbar (the second busbar 10(2) in the example shown in the figure) that is exposed by the corresponding upper surface opening (the second busbar-side upper surface opening 42(2) in the example shown in the figure (see FIG. 4, FIG. 5, and the like)).

Preferably, the upper surface of each of the first and second busbars 10(1), 10(2) is provided with a plating layer (not shown).

A reference numeral 130 in FIG. 7A is a sealing resin layer that is fixed to the upper surface 11 of the busbar assembly 1 so as to protect components such as the semiconductor element 110 and the electrical connection member 120 which are mounted on the busbar assembly 1.

For example, transparent resins such as polyimide, polyamide, and epoxy are used for the sealing resin layer 130.

The sealing resin layer 130 is provided in an area defined by a frame 60.

That is, as shown in FIG. 7A, the busbar assembly 1 according to the present embodiment further has the frame 60 which is fixed to a periphery of the upper surface of the busbar connecting body with the center of the upper surface of the busbar connecting body being opened.

The frame 60 acts as a damming structure at the time of providing the sealing resin layer 130.

That is, the sealing resin layer 130 is provided by applying, to the upper surface of the busbar assembly 1, a resin which forms the sealing resin layer 130 so as to surround components such as the semiconductor element 110 and the electrical connection member 120, and then curing the resin. When the sealing resin layer 130 is provided, it is necessary to provide the damming structure that prevents the resin from flowing out.

The frame 60 has a frame body 65 that has a predetermined thickness, that has an outer peripheral shape, in plan view, corresponding to an outer peripheral shape of the busbar connecting body and that has, at a center in plan view, a central hole 61 enclosing the first and second busbar-side upper surface openings 42(1), 42(2), and an insulating resin layer 70 that covers an outer surface of the frame body 65.

The frame 60 can be formed, for example, by using a metal flat plate having a thickness that corresponds to the thickness of the frame 60, and by forming the central hole 61 in the metal flat plate by press working.

The frame body-side insulating resin layer 70 is formed using an insulating resin material such as polyimide, polyamide, and epoxy.

The frame 60 is fixed by an adhesive or the like to the periphery area of the upper surface of the busbar connecting body in such a manner as to enclose the first and second busbar-side upper surface openings 42(1), 42(2) in plan view.

Figure 7B:
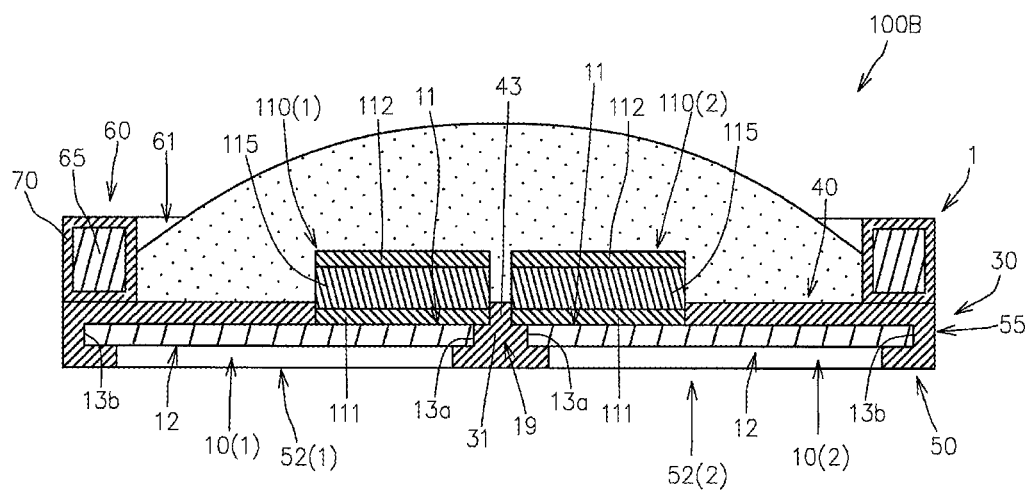

FIG. 7B shows a vertical cross-sectional view of a semiconductor module 100B according to another example, in which the semiconductor elements 110 such as an LED are mounted on the busbar assembly 1.

In the figure, the same reference numeral is given to the same member as in FIG. 7A.

In the semiconductor module 100B, both the space formed by the first busbar-side upper surface opening 42(1) (see FIG. 4, FIG. 5, and the like) and the space formed by the second busbar-side upper surface opening 42(2) (see FIG. 4, FIG. 5, and the like) are used as the semiconductor element mounting space for mounting the semiconductor element 110.

In this case, first and second semiconductor elements 110(1), 110(2) which are mounted on the first and second busbars 10(1), 10(2), respectively, are electrically connected in parallel.

That is, the first busbar 10(1) to which the first electrode layer 111 of the first semiconductor element 110(1) is electrically connected and the second busbar 10(2) to which the first electrode layer 111 of the second semiconductor element 110(2) is electrically connected each act as one of the positive side electrode or the negative side electrode (for example, the positive side electrode).

And the second electrode layer 112 of each of the first and second semiconductor elements 110(1), 110(2) is electrically connected to the other of the positive side electrode or the negative side electrode (for example, the negative side electrode. not shown) via an electrical connection member (not shown) such as wire bonding.

According to the busbar assembly 1, the first and second busbars 10(1), 10(2) are arranged in the common plane, and therefore the size can be reduced as much as possible in the vertical direction (thickness direction).

Further, the first and second busbars 10(1), 10(2) are arranged in such a manner as to face each other at the first side surfaces 13a, and therefore an area where the first and second busbars 10(1), 10(2) face each other can be made as small as possible, compared to a laminated-type busbar assembly where a plurality of busbars are arranged in a laminated manner along a vertical direction; this can effectively prevent or reduce that leakage current flows between the first and second busbars 10(1), 10(2).

Further, with the busbar assembly 1 according to the present embodiment, as shown in FIGS. 4 and 6, the spaced-apart width L2 between the opposing edges of the first and second busbar-side upper surface openings 42(1), 42(2) can be reduced, without forcibly narrowing the width L1 of the gap 19 between the first and second busbars 10(1), 10(2).

Therefore, as shown in FIGS. 7A and 7B, while ensuring a good insulating property between the first and second busbars 10(1), 10(2), the semiconductor elements 110 to be mounted on the first busbar 10(1) and/or the second busbar 10(2) can be arranged in an aggregate manner as much as possible.

Further, a part of the upper surface laminated part 40 that is positioned between the first and second busbar-side upper surface openings 42(1), 42(2) acts as a partitioning wall 43 between the exposed area (hereinafter, referred to as first busbar exposed area) of the first busbar 10(1) that is exposed through the first busbar-side upper surface opening 42(1) and the exposed area (hereinafter, referred to as second busbar exposed area) of the second busbar 10(2) that is exposed through the second busbar-side upper surface opening 42(2), thus making it possible to effectively prevent a short circuit between the first and second busbar exposed areas.

Further, the partitioning wall 43 can also act as a positioning member at the time of mounting the semiconductor element 110, making it possible to improve the accuracy of the mounting position of the semiconductor element 110.

In the present embodiment, as shown in FIG. 2, and the like, the first and second busbar-side upper surface openings 42(1) and 42(2) are positioned in the center of the first and second busbars 10(1), 10(2) with respect to the longitudinal direction of the gap 19.

As shown in FIGS. 4, 5, and the like, in the present embodiment, the insulating resin layer 30 further has a lower surface laminated part 50 provided on the lower surface on the other side of the busbar connecting body in the thickness direction, and a side surface laminated part 55 provided on a side of the busbar connecting body and connecting peripheral edges of the upper surface laminated part 40 and the lower surface laminated part 50.

As shown in FIGS. 3 to 6, in the present embodiment, the lower surface laminated part 50 includes first and second busbar-side lower surface openings 52(1), 52(2) that respectively expose predetermined areas of the lower surfaces 12 of the first and second busbars 10(1), 10(2), respectively.

It is also possible to form, in place of the first and second busbar-side lower surface openings 52(1), 52(2), a single lower surface opening that integrally exposes both of the predetermined areas of the lower surfaces 12 of the first and second busbars 10(1), 10(2).

Figure 8:
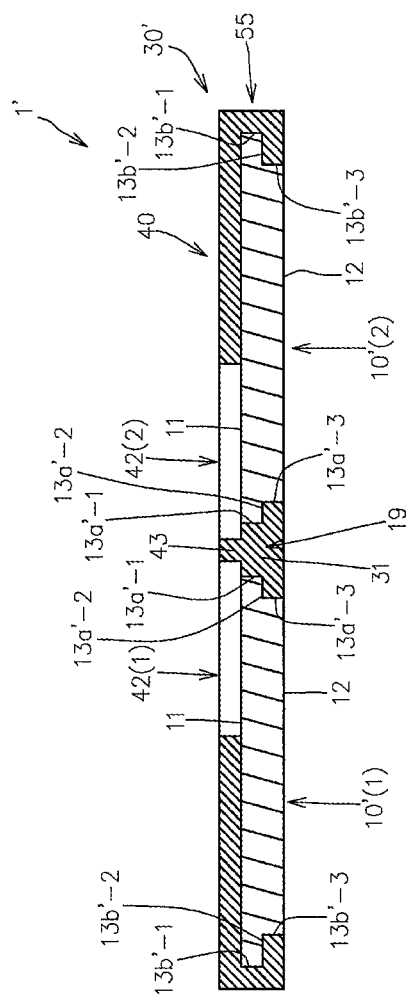
FIG. 8 is a vertical front view of a busbar assembly according to a modification of the embodiment.
Figure 9:
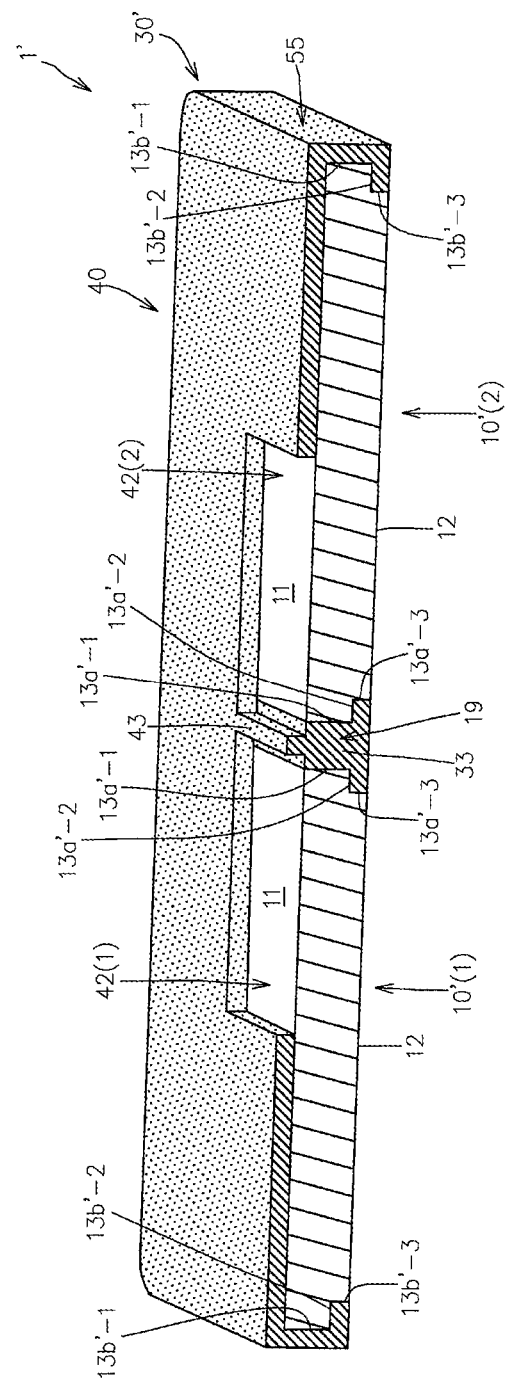
FIG. 9 is a vertical perspective view of the busbar assembly according to the modification.

FIGS. 8 and 9 show a vertical front view and a vertical perspective view, respectively, of a busbar assembly 1' according to a modification of the present embodiment.

In the figures, the same reference numeral is given to the same member as in the present embodiment.

Compared with the present embodiment, the modification 1' has first and second busbars 10'(1), 10'(2) instead of the first and second busbars 10(1), 10(2), and has an insulating resin layer 30' instead of the insulating resin layer 30.

The first and second busbars 10'(1), 10'(2) each have the upper surface 11, the lower surface 12, a first side surface 13a' that faces the gap 19, a second side surface 13b' that turns to the opposite side of the gap 19, a third side surface (not shown) that connects end portions of the upper surface 11, the lower surface 12, the first side surface 13a' and the second side surface 13b' that are positioned on side of the gap 19 in the longitudinal direction, and a fourth side surface (not shown) that connects end portions of the upper surface 11, the lower surface 12, the first side surface 13a' and the second side surface 13b' that are positioned on the other side of the gap 19 in the longitudinal direction.

The first side surface 13a' has an upper surface adjacent section 13a'-1 that extends from the upper surface 11 to the other side in the thickness direction, a step section 13a'-2 that extends, from an end portion of the upper surface adjacent section 13a'-1 that is positioned on the other side in the thickness direction, in a direction proximate to the second side surface 13b', and a lower adjacent section 13a'-3 that extends, from an end portion of the step section 13a'-2 that is positioned on a side proximate to the second side surface 13b', to the other side in the thickness direction to reach the lower surface 12.

Similarly, the second side surface 13b' has an upper surface adjacent section 13b'-1 that extends from the upper surface 11 to the other side in the thickness direction, a step section 13b'-2 that extends, from an end portion of upper surface adjacent section 13b'-1 that is positioned on the other side in the thickness direction, in a direction proximate to the first side surface 13a', and a lower surface adjacent section 13b'-3 that extends, from an end portion of the step section 13b'-2 that is positioned on a side proximate to the first side surface 13a', to the other side in the thickness direction to reach the lower surface 12.

The insulating resin layer 30' has the gap filling part 31 and the upper surface laminated part 40, and also has a side surface laminated part 55' integrally formed with the upper surface laminated part 40 in such a manner as to cover the side surfaces of the busbar connecting body while exposing the lower surfaces 12 of the first and second busbars 10'(1), 10'(2).

Next, a manufacturing method of the busbar assembly 1 will be explained.

Figure 10:
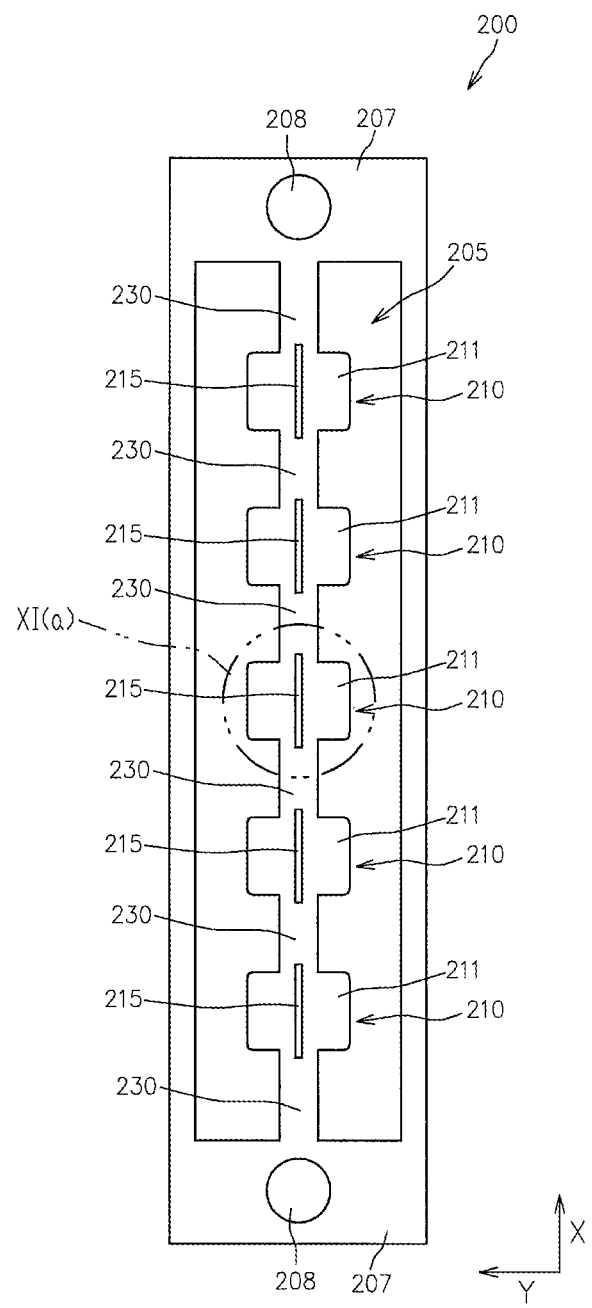
FIG. 10 is a plan view of a busbar-directed conductive metal flat plate used in one example of a manufacturing method of the busbar assembly according to the embodiment.

FIG. 10 shows a plan view of a busbar-directed conductive metal flat plate 200 used in the manufacturing method.

Figure 11A:
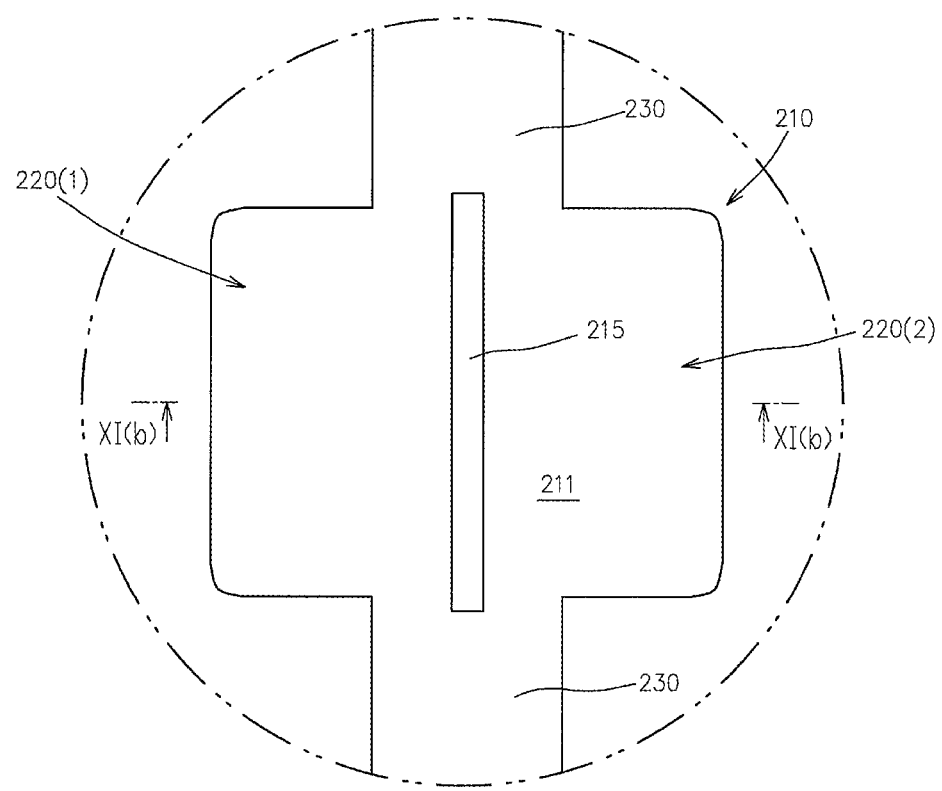
FIG. 11A is an enlarged view of the part XI(a) in FIG. 10.
Figure 11B:
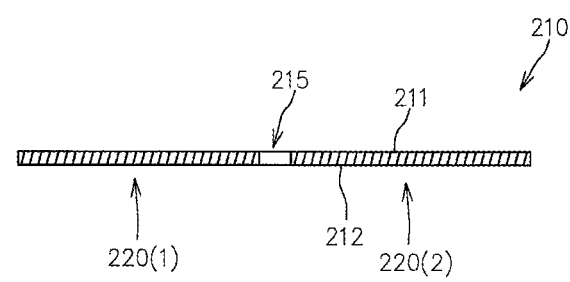
FIG. 11B is a cross-sectional view along the XI(b)-XI(b) line in FIG. 11A.

FIG. 11A shows an enlarged view of the part XI(a) in FIG. 10, and FIG. 11B shows a cross-sectional view along the XI(b)-XI(b) line in FIG. 11A.

As shown in FIGS. 10, 11A and 11B, the manufacturing method has a process of preparing the busbar-directed conductive metal flat plate 200 having a busbar assembly forming area 210 for forming the first and second busbars 10(1), 10(2), a slit forming process of forming, in the busbar assembly forming area 210, a slit 215 that penetrates between an upper surface 211 on one side in the thickness direction and a lower surface 212 on the other side in the thickness direction.

FIGS. 10, 11A and 11B show a state after completion of the slit forming process.

The busbar-directed conductive metal flat plate 200 is configured to have the same thickness as the first and second busbars 10(1), 10(2), and the busbar assembly forming area 210 is configured to have the same shape in plan view as the busbar connecting body.

The slit 215 has the same width as the gap 19, and is the same as or longer than the gap 19, and divides the busbar assembly forming area 210 into first and second busbar forming sites 220(1), 220(2) that respectively correspond to the first and second busbars 10(1), 10(2).

In the case of manufacturing a busbar assembly in which three or more busbars including any other busbar in addition to the first and second busbars 10(1), 10(2) are arranged in parallel, the number of slits calculated by subtracting one from the quantity of busbars are formed.

That is, for example, in the case of manufacturing a busbar assembly including three busbars arranged in parallel, two slits are formed.

As shown in FIGS. 10 and 11, in the present embodiment, the busbar-directed conductive metal flat plate 200 has a busbar row 205 that includes a plurality of busbar assembly forming areas 210 arranged in series along the X direction in the X-Y plane where the conductive metal flat plate 200 is positioned, and a connecting area 230 that connects the busbar assembly forming areas 210 adjacent to each other in the X direction, and is configured so that a processing treatment can be performed on the plurality of busbar assembly forming areas 210 at the same time.

In the present embodiment, the busbar-directed conductive metal flat plate 200 further has a pair of grip pieces 207 which are connected respectively to one side and the other side of the busbar row 205 in the longitudinal direction (X direction), and the pair of grip pieces 207 are provided with aligning holes 208.

It is also possible to have a plurality of busbar rows 205 arranged in parallel in the Y direction and be held together by the pair of grip pieces 207, 207.

According to the above modified configuration, more busbar assemblies 1 can be manufactured simultaneously.

The busbar assembly forming area 210 has the same length in the X direction as the length of the busbar assembly 1 along the longitudinal direction of the gap 19, and also has the same length in the Y direction as the length of the busbar assembly 1 along the width direction of the gap 19.

The slit 215 forms the gap 19 in the busbar assembly 1 and is the same in width as the gap 19.

The width of the gap 19 is determined according to the specification of the busbar assembly 1.

In the present embodiment, the slit 215 formed in one busbar assembly forming area 210 has one side, in the longitudinal direction (X direction), that extends into one connecting area 230 connected to one side of the one busbar assembly forming area 210 in the longitudinal direction (X direction), and the other side, in the longitudinal direction (X direction), that extends into the other connecting area 230 connected to the other side of the one busbar assembly forming area 230 in the longitudinal direction (X direction).

In this case, in the state after the slit forming process, the first and second busbar forming sites 220(1), 220(2) facing each other via the slit 215 formed in the one busbar assembly forming area 210 are maintained in a state of being connected to each other via the one connecting area 230 and the other connecting area 230.

Therefore, the slit 215 (the gap 19) can be formed with high accuracy.

The manufacturing method has a process of providing an insulating resin material 240, which forms the insulating resin layer 30, in the slit 215 and on the outer surface of the busbar forming area 210 after the slit forming process, and curing the insulating resin material 240 thereby to provide the insulating resin layer 30.

Figure 12:
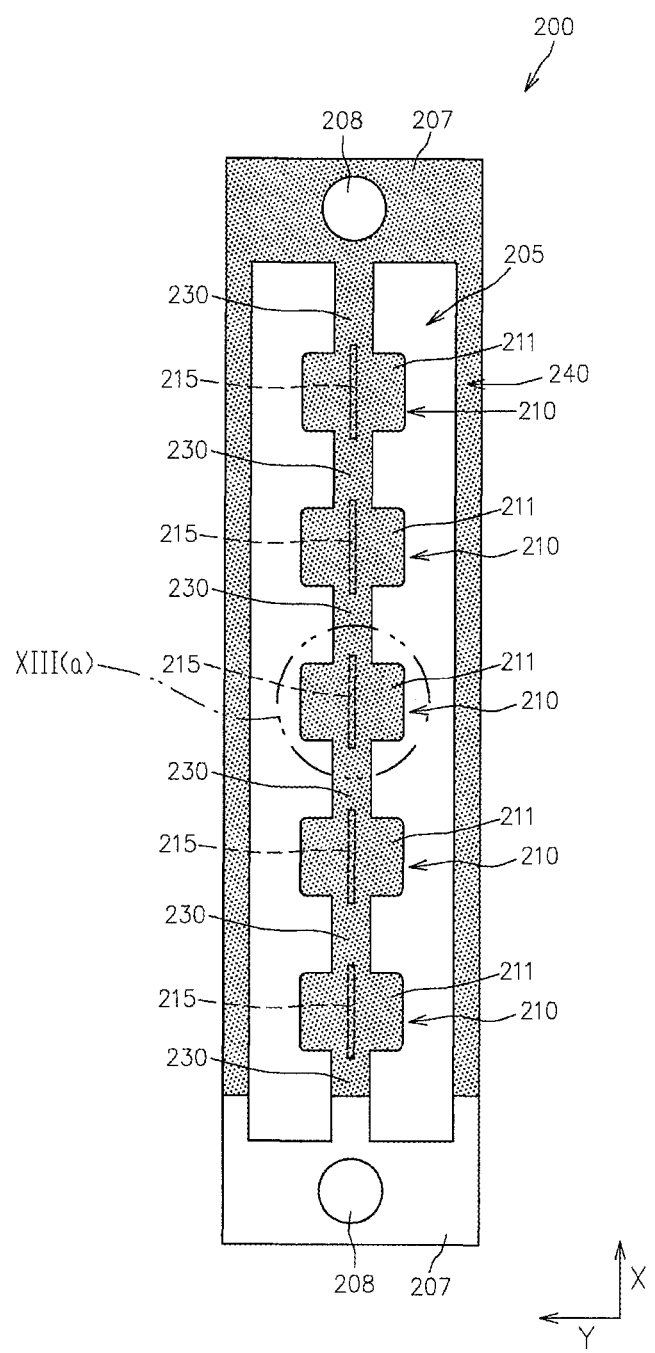
FIG. 12 is a plan view of the busbar-directed conductive metal flat plate after a process of providing an insulating resin material in the manufacturing method.

FIG. 12 shows a plan view of the busbar-directed conductive metal flat plate 200 in a state of being provided with the insulating resin layer 30.

Figure 13A:
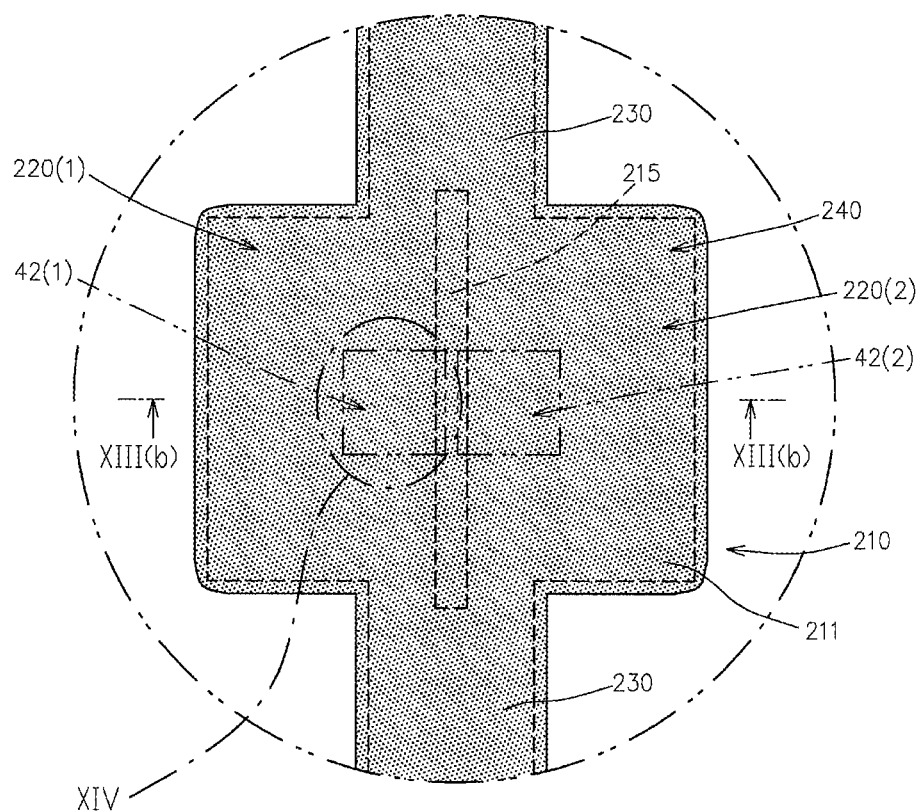
FIG. 13A is an enlarged view of the part XIII(a) in FIG. 12.
Figure 13B:
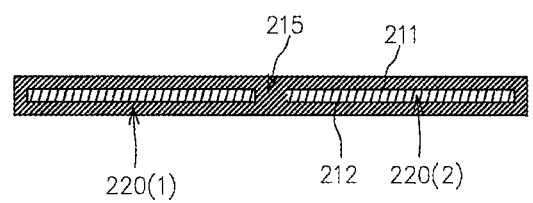
FIG. 13B is a cross-sectional view along the line XIII(b)-XIII(b) in FIG. 13A.

FIG. 13A shows an enlarged view of the part XIII(a) in FIG. 12, and FIG. 13B shows a cross-sectional view along the line XIII(b)-XIII(b) in FIG. 13A.

The insulating resin material 240 is an insulating resin with heat resistance and insulation properties, such as polyimide, polyamide, and epoxy, and INSULEED (registered trademark) is preferably used.

Setting of the insulating resin material 240 can be done, for example, by electrodeposition coating of a paint containing the insulating resin material 240.

Instead, it is also possible to apply the powder of the insulating resin material 240 by electrostatic powder coating.

Or, if it is sufficiently secured that the resin is filled into the slit 215, it is also possible to apply the paint containing the insulating resin material 240 by spray-painting.

Curing of the insulating resin material 240 is performed, for example, by heating the insulating resin material 240 at a predetermined temperature for a predetermined time.

The manufacturing method has a laser beam irradiating process that irradiates, with a laser beam, the area out of the upper surface of the upper surface laminated part 40 that corresponds to the first and second busbar-side upper surface openings 42(1), 42(2) to form the first and second busbar-side upper surface openings 42(1), 42(2) after the process of providing the insulating resin material 240.

The laser beam irradiating process is configured to repeat a laser irradiating operation several times, the laser irradiating operation including a large pulse width laser irradiating operation in which the entirety of the corresponding area is irradiated with a large pulse width laser and a small pulse width laser irradiating operation in which the entirety of the corresponding area is irradiated with a small pulse width laser.

Figure 14A:
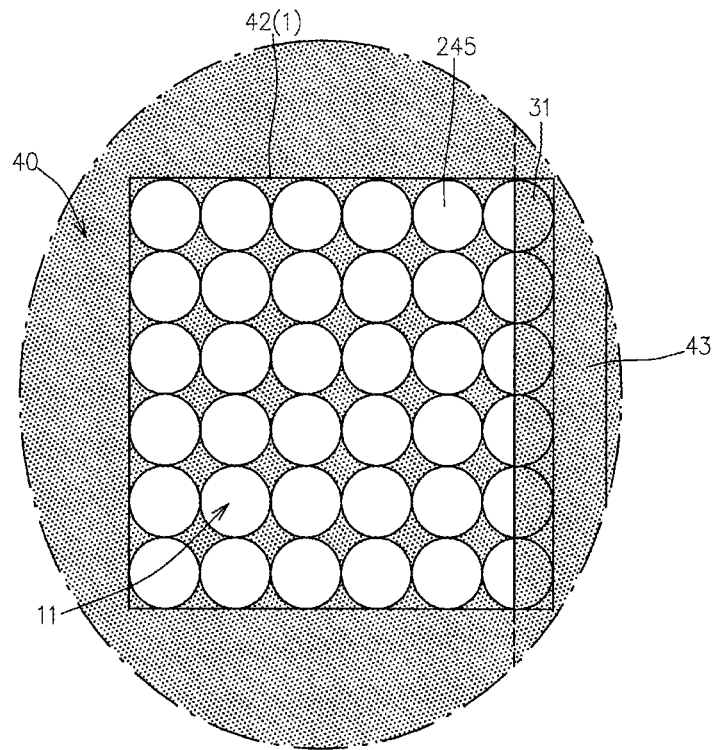
FIGS. 14A and 14B are enlarged views of the part XIV in FIG. 13A, and respectively show states after a large pulse width laser irradiating operation and a small pulse width laser irradiating operation in the manufacturing method have been performed.
Figure 14B:
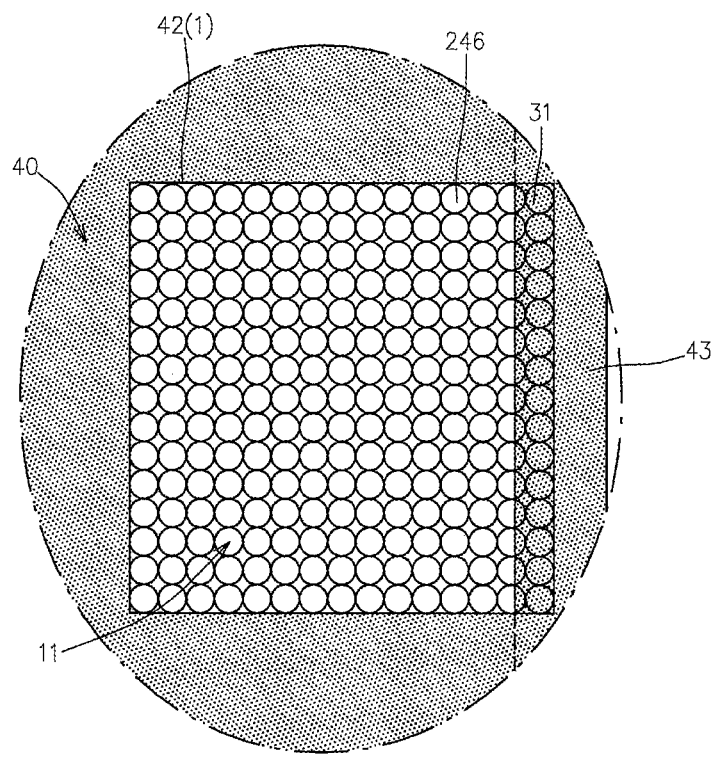

FIGS. 14A and 14B show an enlarged view of the part XIV in FIG. 13A.

FIGS. 14A and 14B respectively show states after the large pulse width laser irradiating operation and the small pulse width laser irradiating operation have been performed on the area that corresponds to the first busbar-side upper surface opening 42(1).

Reference numerals 245 and 246 in FIGS. 14A and 14B are irradiating spots of the large pulse width pulsed laser and the small pulse width pulsed laser, respectively.

As long as being able to melt the insulating resin layer 30, the laser beam in the laser beam irradiating process can be of various wavelengths; for example, the wavelength is 1064 nm.

Regarding the large pulse width pulsed laser; while the peak output power is weakened, the time for irradiating the upper surface laminated part 40 of the insulating resin layer 30 which is an object to be irradiated becomes long, and therefore the degree of heat diffusion in the upper surface laminated part 40 is strengthened, and the irradiation pitch (diameter of a hole drilled in the upper surface laminated part 40) becomes large.

Meanwhile, regarding the small pulse width pulsed laser; the time for irradiating the upper surface laminated part 40 of the insulating resin layer 30 which is the object to be irradiated becomes short, and therefore the degree of heat diffusion in the upper surface laminated part 40 is weakened, and the irradiation pitch (diameter of the hole drilled in the upper surface laminated part 40) becomes small, whereas the peak output power is strengthened, thus making it possible to form a sharp hole edge.

Therefore, repeating the large pulse width laser irradiating operation and the small pulse width laser irradiating operation multiple times can form the first and second busbar-side upper surface openings 42(1) and 42(2) in a beautiful edge state.

As described above, the first busbar-side upper surface opening 42(1), in plan view, includes the predetermined area that straddles the boundary of the first busbar 10(1) and the gap filling part 31, and the second busbar-side upper surface opening 42(2), in plan view, includes the predetermined area that straddles the boundary of the second busbar 10(2) and the gap filling part 31.

That is, the gap filling part 31 is present directly under a part of the upper surface laminated part 40 to be melted by the laser beam irradiating process.

Here, laser parameters including the large and small pulse widths, repetition frequency, pulse energy and peak power of the laser beam in the laser beam irradiating process are set so that, while the upper surface laminated part 40 positioned on the gap filling part 31 is melted, the gap filling part 31 is not melted.

The set value of the laser parameters can be known based on an experiment, depending on the type and thickness of the insulating resin layer 30 which is the object to be irradiated.

In addition to the laser beam irradiating process of forming the first and second busbar-side upper surface openings 42(1), 42(2), the manufacturing method also includes a lower surface laser beam irradiating process that irradiates the laser beam to a predetermined area of the lower surface laminated part 50 thereby to form the first and second busbar-side lower surface openings 52(1) and 52(2).

Figure 15:
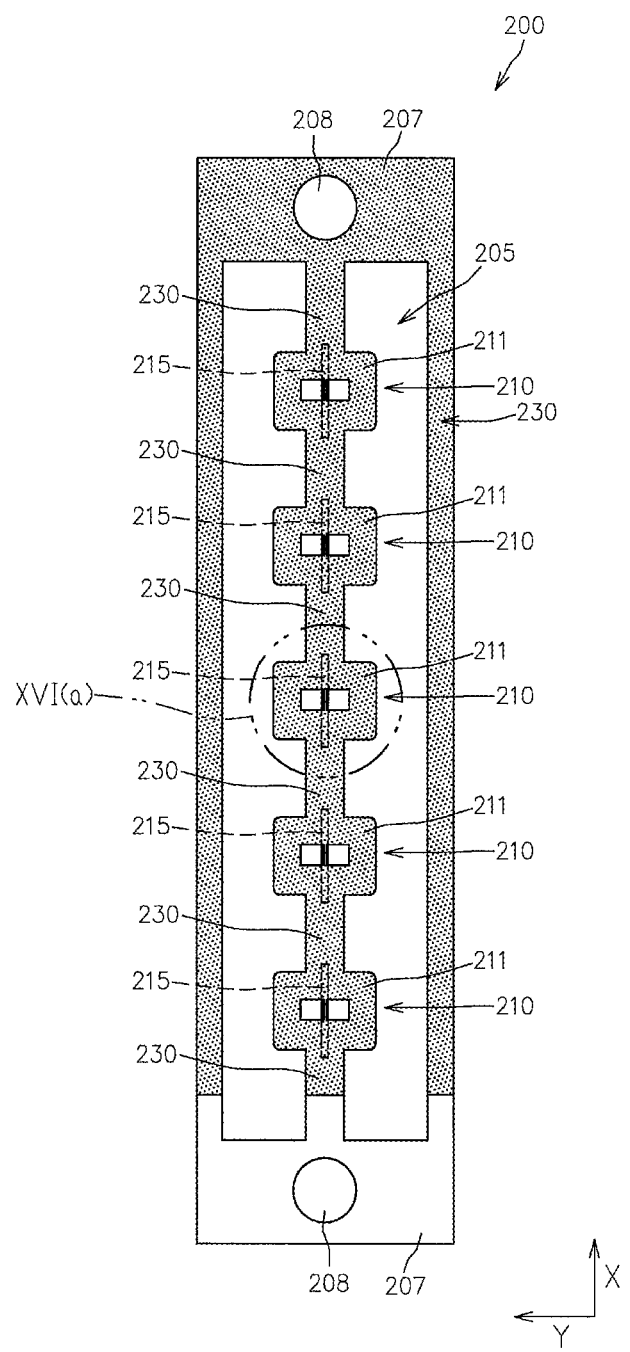
FIG. 15 is a plan view of the busbar-directed conductive metal flat plate after the laser beam irradiating process and a lower surface laser beam irradiating process to the lower surface.

FIG. 15 shows a plan view of the busbar-directed conductive metal flat plate 200 after the laser beam irradiating process and the lower surface laser beam irradiating process.

Figure 16A:
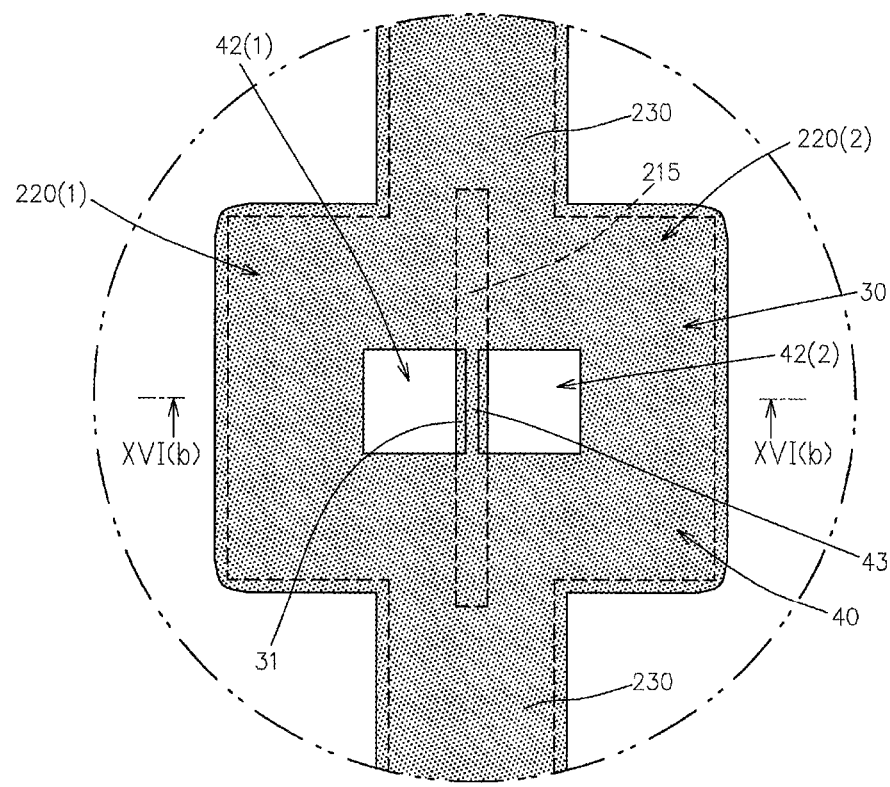
FIG. 16B is a cross-sectional view along the line XVI(b)-XVI(b) in FIG. 16A.
Figure 16B:
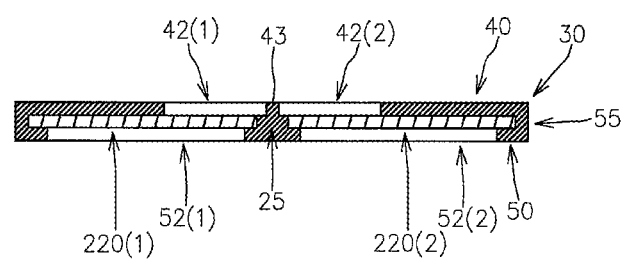

Further, FIG. 16A shows an enlarged view of the part XVI(a) in FIG. 15, and FIG. 16B shows a cross-sectional view along the line XVI(b)-XVI(b) in FIG. 16A.

The above manufacturing method is so configured as to perform a frame forming process that forms the frame 60 at any timing from the process of preparing the busbar-directed conductive metal flat plate 200 to the laser beam irradiating process, or before the process of preparing the busbar-directed conductive metal flat plate 200, or after the laser beam irradiating process.

Figure 17:
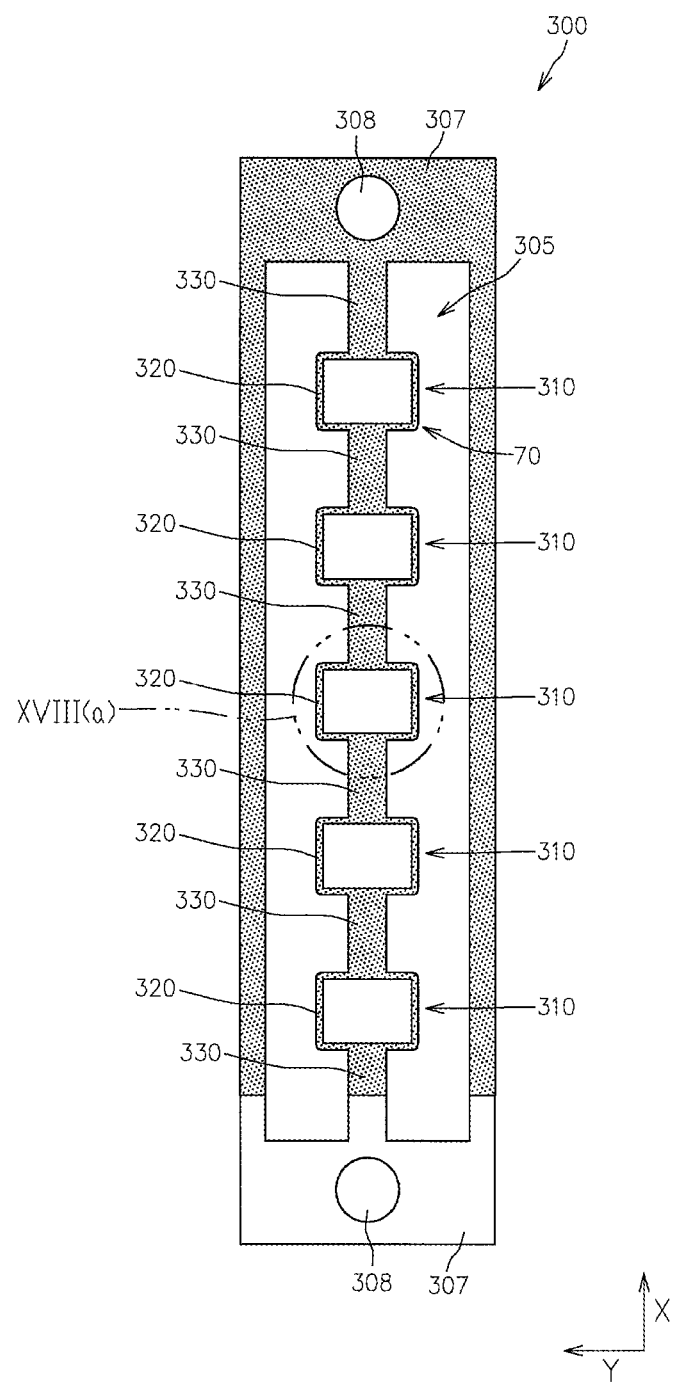
FIG. 17 is a plan view of a frame-directed conductive metal flat plate used in a frame forming process in the manufacturing method.

FIG. 17 shows a plan view of a frame-directed conductive metal flat plate 300 used in the frame forming process described above.

Figure 18A:
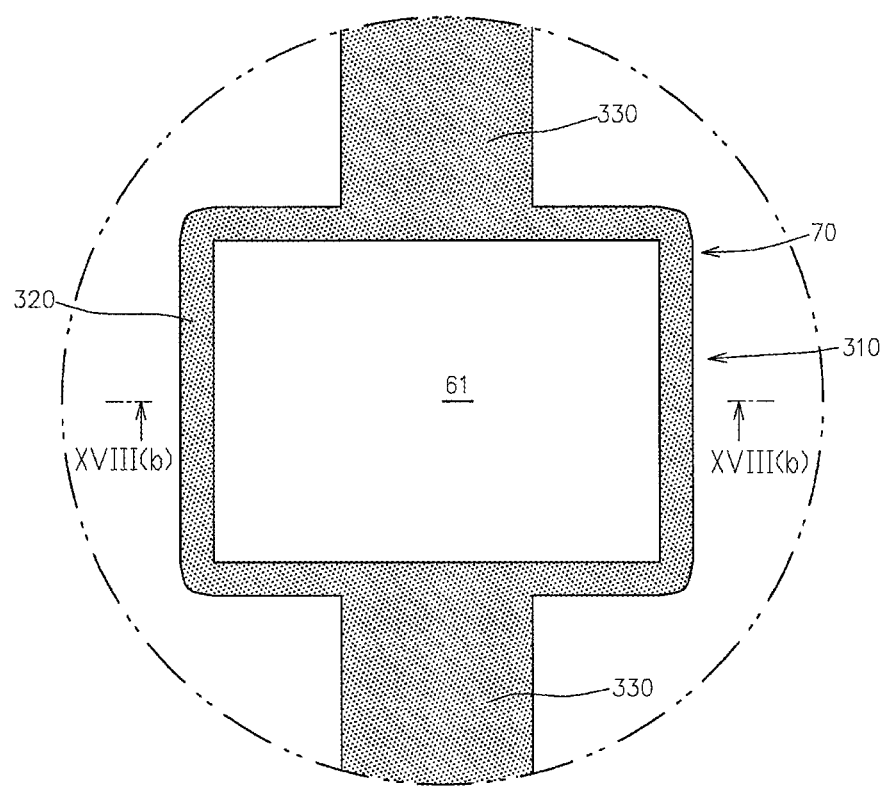
FIG. 18A is an enlarged view of the part XVIII(a) in FIG. 17.
Figure 18B:
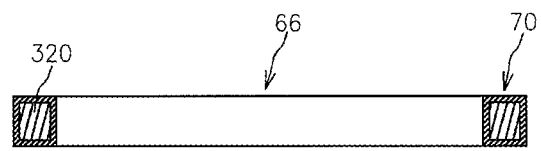
FIG. 18B is a cross-sectional view along the line XVIII(b)-XVIII(b) in FIG. 18A.

Further, FIG. 18A shows an enlarged view of the part XVIII(a) in FIG. 17, and FIG. 18B shows a cross-sectional view along the line XVIII(b)-XVIII(b) in FIG. 18A.

As shown in FIGS. 17, 18A and 18B, the frame forming process includes: a process of preparing the frame-directed conductive metal flat plate 300 having a frame forming area 310 that has the same thickness as the thickness of the frame body 65 and that has an outer peripheral shape, in plan view, corresponding to the busbar assembly forming area 210; a process of punching out the center of the frame forming area 310 so that a frame body forming site 320 in the frame forming area 310 remains; and a process of applying, to an outer surface of the frame body forming site 320, an insulating resin material 270 that forms the insulating resin layer 70, and then curing the insulating resin material 270 thereby to provide the insulating resin layer 70.

FIG. 17 shows a state after the process of providing the insulating resin layer 70 on the outer surface of the frame body forming site 320.

The frame-directed conductive metal flat plate 300 is configured so that when the frame-directed conductive metal flat plate 300 is overlapped with the busbar-directed conductive metal flat plate 200, the frame forming area 310 is aligned with the busbar assembly forming area 210.

In detail, as described above, the busbar-directed conductive metal flat plate 200 has the busbar row 205 that includes a plurality of busbar assembly forming areas 210 arranged in series along the X direction, and the connecting area 230 that connects the busbar assembly forming areas 210 adjacent to each other in the X direction.

Therefore, as shown in FIG. 17, the frame-directed conductive metal flat plate 300 has a frame row 305 that includes a plurality of frame forming areas 310 arranged in series in the X direction at the same pitch as the plurality of busbar assembly forming areas 210, and a connecting area 330 that connects the frame forming areas 310 adjacent to each other in the X direction.

As described above, the busbar-directed conductive metal flat plate 200 has the pair of grip pieces 207 which are connected respectively to one side and the other side of the busbar row 205 in the longitudinal direction (X direction), and the pair of grip pieces 207 are provided with the aligning holes 208.

Corresponding to the above, as shown in FIG. 17, the frame-directed conductive metal flat plate 300 also includes a pair of grip pieces 307 which are connected respectively to one side and the other side of the frame row 305 in the longitudinal direction (X direction), and the pair of grip pieces 307 are provided with aligning holes 308 that correspond to the aligning holes 208.

The central area to be punched out in the punching process is an area having such a size that, when the frame forming area 310 is overlapped with the busbar assembly forming area 210, the frame body forming site 320 surrounds the first and second busbar-side upper surface openings 42(1), 42(2).

Setting of the insulating resin material 270 on the frame body forming site 320 can be performed, for example, by electrodeposition coating of the paint containing an insulating resin having heat resistance and insulation properties, such as polyimide, polyamide, and epoxy.

Instead, it is also possible to apply the powder of the insulating resin material 270 by electrostatic powder coating.

Alternatively, it is possible to apply the paint containing the insulating resin material 270 by spray-painting.

Preferably, the process of providing the insulating resin material 270 on the frame body forming site 320 can be simultaneously performed in the same way as the process of providing the insulating resin material 240 on the busbar forming area 210.

That is, in a case where the insulating resin material 240 is to be set on the busbar forming area 210 by the electrodeposition coating, the insulating resin material 270 can be set on the frame body forming site 320 as well by the electrodeposition coating. In a case where the insulating resin material 240 is set on the busbar forming area 210 by the electrostatic powder coating, the insulating resin material 270 can be set on the frame body forming site 320 as well by the electrostatic powder coating.

The above configuration can improve the manufacturing efficiency.

The manufacturing method further includes a process of fixing, with an adhesive, to the upper surface of the busbar-directed conductive metal flat plate 200 provided with the insulating resin layer 30, the frame-directed conductive metal flat plate 300 provided with the insulating resin layer 70, in such a manner as to surround the first and second busbar-side upper surface openings 42(1), 42(2).

Figure 19:
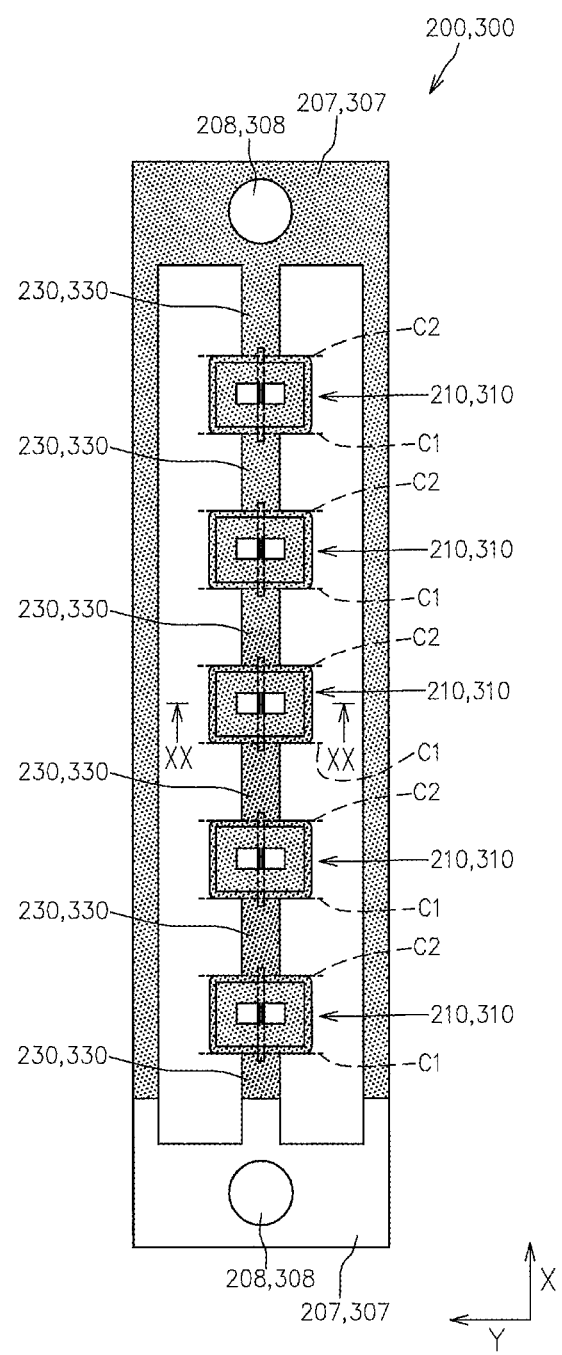
FIG. 19 is a plan view of the busbar-directed conductive metal flat plate and the frame-directed conductive metal flat plate that are fixed to each other in a fixing process which is one process in the manufacturing method.

FIG. 19 shows a plan view of the busbar-directed conductive metal flat plate 200 and the frame-directed conductive metal flat plate 300 after the above fixing process.

Figure 20:
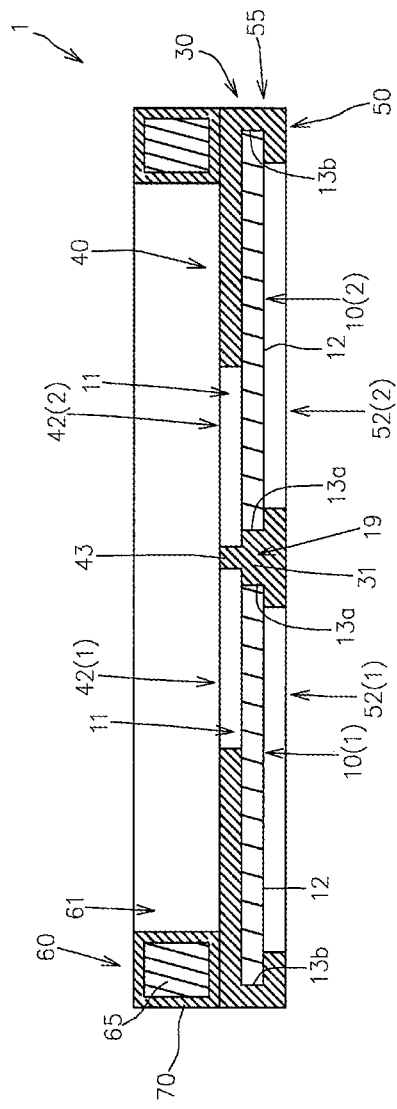
FIG. 20 is a cross-sectional view along the line XX-XX in FIG. 19.
Figure 21A:
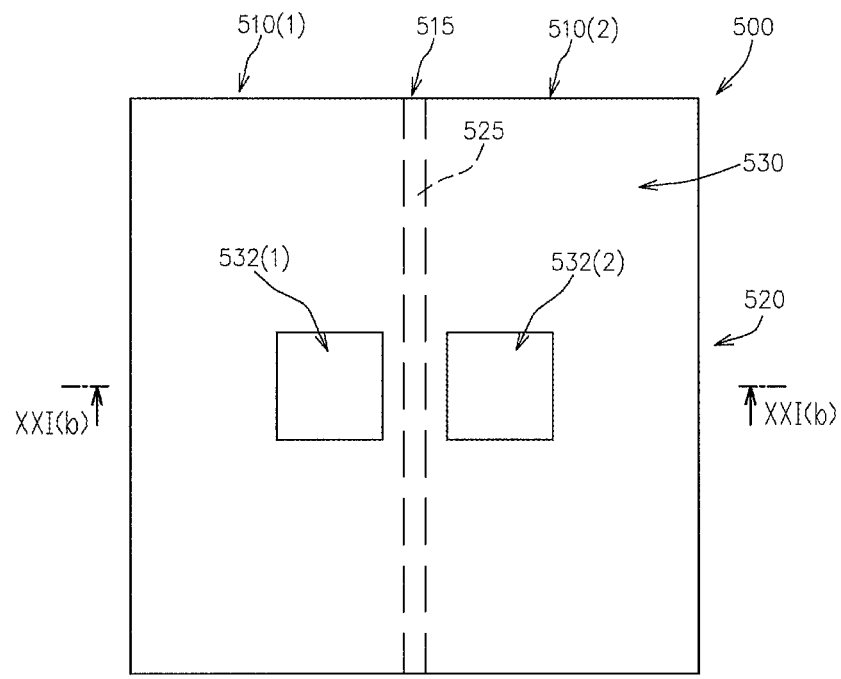
FIG. 21A is a plan view of a conventional planar-type busbar assembly.
Figure 21B:
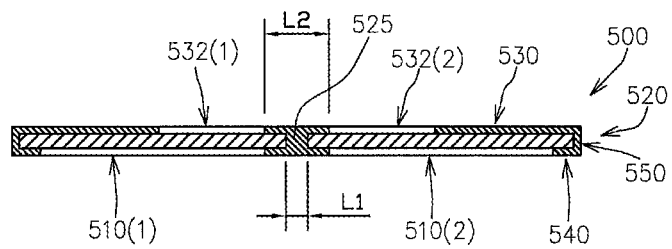
FIG. 21B is a cross-sectional view along the line XXI(b)-XXI(b) in FIG. 21A.
Figure 21C:
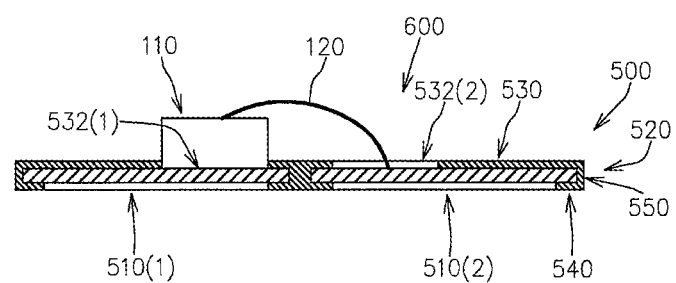
FIG. 21C is a vertical cross-sectional view of a semiconductor module in which a semiconductor element is mounted on the conventional planar-type busbar assembly.

FIG. 20 shows a cross-sectional view along the line XX-XX in FIG. 19.

Then, the manufacturing method has a cutting process that cuts, after the fixing process, the busbar-directed conductive metal flat plate 200 and the frame-directed conductive metal flat plate 300 which are overlapped to each other, at cutting lines C1 and C2 respectively along one side edge and the other side edge of the busbar assembly forming area 210 in the X direction, and takes out the busbar assembly forming area 210 and the frame forming area 310.

The manufacturing method having the above configuration can efficiently manufacture the busbar assembly 1 according to the present embodiment.

DESCRIPTION OF THE REFERENCE NUMERALS 1, 1' busbar assembly
10(1), 10(2) first and second busbars
11 upper surface
12 lower surface
13a, 13a' first side surface
13a'-1 upper surface adjacent section
13a'-2 step section
13a'-3 lower adjacent section
13b, 13b' second side surface
13b'-1 upper surface adjacent section
13b'-2 step section
13b'-3 lower adjacent section
13c third side surface
13d fourth side surface
19 gap
30 insulative resin layer
31 gap filling part
40 upper surface laminated part
42(1), 42(2) first and second busbar-side upper surface openings
43 partitioning wall
50 lower surface laminated part
52(1), 52(2) first and second busbar-side lower surface openings
55 side surface laminated part
60 frame
61 central hole
65 frame body
70 insulating resin layer
200 busbar-directed conductive metal flat plate
210 busbar assembly formation area
215 slit
220(1), 220(2) first and second busbar forming sites
230 connecting area
240, 270 insulating resin material
300 frame-directed conductive metal flat plate
310 frame forming area
320 frame body forming site

The invention claimed is:

1. A busbar assembly comprising:
first and second busbars formed by a conductive flat plate member and disposed in a common plane with a gap provided therebetween;
an insulative resin layer including a gap filling part filled into the gap and an upper surface laminated part provided on an upper surface on one side in a plate thickness direction of a busbar connecting body in which the first and second busbars are connected to each other by the gap filling part;
the upper surface laminated part having a first busbar-side upper surface opening that exposes a predetermined area out of the upper surfaces of the first busbar and the gap filling part that straddles a boundary therebetween, and a second busbar-side upper surface opening that exposes a predetermined area out of the upper surfaces of the second busbar and the gap filling part that straddles a boundary therebetween; and
a part of the upper surface laminated part that is positioned between the first and second busbar-side upper surface openings forming a partitioning wall;
wherein the insulating resin layer has a lower surface laminated part provided on a lower surface on the other side of the busbar connecting body in the thickness direction, and a side surface laminated part provided on a side surface of the busbar connecting body and connecting peripheral edges of the upper surface laminated part and the lower surface laminated part, and
wherein the lower surface laminated part having a lower surface opening that exposes a predetermined area of the lower surfaces of the first and second busbars.

2. The busbar assembly according to claim 1, wherein the first and second busbar-side upper surface openings are positioned in the center of the first and second busbars with respect to a longitudinal direction of the gap.

3. A busbar assembly according to claim 1,
wherein the first and second busbars each have the upper surface, a lower surface on the other side in the thickness direction, a first side surface that faces the gap, a second side surface that turns to the opposite side of the gap, a third side surface that connects end portions of the upper surface, the lower surface, the first side surface and the second side surface that are positioned on one side of the gap in the longitudinal direction, and a fourth side surface that connects end portions of the upper surface, the lower surface, the first side surface and the second side surface that are positioned on the other side of the gap in the longitudinal direction,
wherein the first side surface has an upper surface adjacent section that extends from the upper surface to the other side in the thickness direction, a step section that extends, from an end portion of the upper surface adjacent section that is positioned on the other side in the thickness direction, in a direction proximate to the second side surface, and a lower adjacent section that extends, from an end portion of the step section that is positioned on a side proximate to the second side surface, to the other side in the thickness direction to reach the lower surface,
wherein the second side surface has an upper surface adjacent section that extends from the upper surface to the other side in the thickness direction, a step section that extends, from an end portion of upper surface adjacent section that is positioned on the other side in the thickness direction, in a direction proximate to the first side surface, and a lower surface adjacent section that extends, from an end portion of the step section that is positioned on a side proximate to the first side surface, to the other side in the thickness direction to reach the lower surface, and
wherein the insulating resin layer has a side surface laminated part integrally formed with the upper surface laminated part in such a manner as to cover the side surface of the busbar connecting body while exposing the lower surfaces of the first and second busbars.

4. A busbar assembly according to claim 1, further comprising a frame that includes a frame body and an insulating resin layer, the frame body having an outer peripheral shape, in plan view, corresponding to an outer peripheral shape of the busbar connecting body and having, at a center in plan view, a central hole that encloses the first and second busbar-side upper surface openings, the insulating resin layer covering an outer surface of the frame body,
wherein the frame is fixed to a periphery area of the upper surface of the busbar connecting body in such a manner as to enclose, in plan view, the first and second busbar-side upper surface openings.

5. A method for manufacturing a busbar assembly including first and second busbars formed by a conductive flat plate member and disposed in a common plane with a gap provided between adjacent busbars, and an insulating resin layer including a gap filling part filled into the gap, an upper surface laminated part provided on an upper surface on one side in a plate thickness direction of a busbar connecting body in which the first and second busbars are connected to each other by the gap filling part, a lower surface laminated part provided on a lower surface on the other side of the busbar connecting body in the thickness direction, and a side surface laminated part provided on a side surface of the busbar connecting body and connecting peripheral edges of the upper surface laminated part and the lower surface laminated part, wherein the upper surface laminated part has a first busbar-side upper surface opening that exposes a predetermined area out of the upper surfaces of the first busbar and the gap filling part that straddles a boundary therebetween, and a second busbar-side upper surface opening that exposes a predetermined area out of the upper surfaces of the second busbar and the gap filling part that straddles a boundary therebetween, and a part of the upper surface laminated part that is positioned between the first and second busbar-side upper surface openings forms a partitioning wall, and wherein the lower surface laminated part has a lower surface opening that exposes a predetermined area of the lower surfaces of the first and second busbars, the method comprising:
a process of preparing a busbar-directed conductive metal flat plate having a busbar assembly forming area that forms the first and second busbars;
a slit forming process of forming, in the busbar assembly forming area, a slit penetrating between an upper surface on one side and a lower surface on the other side in the thickness direction and having a width same as the gap so as to define first and second busbar forming sites corresponding to the first and second busbars;
a process of providing an insulative resin material in the slit and on an entirety of the upper surface, the lower surface and a side surface of the busbar assembly forming area;
a process of curing the insulative resin material to form the insulating resin layer including the gap filling part the upper surface laminated part, the lower surface laminated part and the side surface laminated part;
a laser beam irradiating process of irradiating a laser beam to areas out of the upper surface of the upper surface laminated part that correspond to the first and second busbar-side upper surface openings to form the first and second busbar-side upper surface openings and irradiating a laser beam to the predetermined area of the lower surface laminated part to form the lower surface opening; and
a cutting process of cutting the busbar assembly forming area from the busbar-directed conductive metal flat plate,
wherein the laser beam irradiating process is configured to repeat a laser irradiating operation several times, the laser irradiating operation including a large pulse width laser irradiating operation in which the entirety of the corresponding area is irradiated with a large pulse width laser and a small pulse width laser irradiating operation in which the entirety of the corresponding area is irradiated with a small pulse width laser.

6. The method for manufacturing the busbar assembly according to claim 5,
wherein the busbar-directed conductive metal flat plate integrally has a plurality of the busbar assembly forming areas arranged in series in a first direction along a longitudinal direction of the slit, and connecting areas connecting between adjacent busbar assembly forming areas, and
wherein the slit formed in one busbar assembly forming area has one side in the longitudinal direction extending into one connecting area connected to the one side in the first direction of the one busbar assembly forming area, and another side in the longitudinal direction extending into another connecting area connected to another side in the first direction of the one busbar assembly forming area.

7. The method for manufacturing the busbar assembly according to claim 5, further comprising:
a process of preparing a frame-directed conductive metal flat plate that includes a frame forming area having an outer peripheral shape, in plan view, corresponding to the busbar assembly forming area;
a process of forming, in the frame forming area, a central hole that encloses, in plan view, the first and second busbar-side upper surface openings to form a frame body forming site;
a process of applying an insulating resin material to an outer surface of the frame body forming site;
a process of curing the insulating resin material to form an insulating resin layer enclosing the outer surface of the frame body forming site; and
a metal flat plate fixing process of fixing the frame-directed conductive metal flat plate to the busbar-directed conductive metal flat plate in a state where the frame-directed conductive metal flat plate is overlapped with the busbar-directed conductive metal flat plate,
wherein cutting process is performed after metal flat plate fixing process.

8. A busbar assembly comprising:
first and second busbars formed by a conductive flat plate member and disposed in a common plane with a gap provided therebetween;
an insulative resin layer including a gap filling part filled into the gap, an upper surface laminated part provided on an upper surface on one side in a plate thickness direction of a busbar connecting body in which the first and second busbars are connected to each other by the gap filling part, a lower surface laminated part provided on a lower surface on the other side of the busbar connecting body in the thickness direction, and a side surface laminated part provided on a side of the busbar connecting body and connecting peripheral edges of the upper surface laminated part and the lower surface laminated part;
the upper surface laminated part having first and second busbar-side upper surface openings that respectively expose parts of the upper surfaces of the first and second busbars;
the lower surface laminated part having first and second busbar-side lower surface openings that respectively expose predetermined areas of the lower surfaces of the first and second busbars respectively.

9. A busbar assembly comprising:
first and second busbars formed by a conductive flat plate member and disposed in a common plane with a gap provided therebetween;
an insulative resin layer including a gap filling part filled into the gap, an upper surface laminated part provided on an upper surface on one side in a plate thickness direction of a busbar connecting body in which the first and second busbars are connected to each other by the gap filling part, a lower surface laminated part provided on a lower surface on the other side of the busbar connecting body in the thickness direction, and a side surface laminated part provided on a side of the busbar connecting body and connecting peripheral edges of the upper surface laminated part and the lower surface laminated part;
the upper surface laminated part having first and second busbar-side upper surface openings that respectively expose parts of the upper surfaces of the first and second busbars; and the lower surface laminated part having a single lower surface opening that integrally exposes both of the predetermined areas of the lower surfaces of the first and second busbars.

10. A busbar assembly comprising:
first and second busbars formed by a conductive flat plate member and disposed in a common plane with a gap provided therebetween;
an insulative resin layer including a gap filling part filled into the gap and an upper surface laminated part provided on an upper surface on one side in a plate thickness direction of a busbar connecting body in which the first and second busbars are connected to each other by the gap filling part;
the first and second busbars each having the upper surface on one side in the plate thickness direction, a lower surface on the other side in the plate thickness direction, a first side surface that faces the gap, a second side surface that turns to the opposite side of the gap, a third side surface that connects end portions of the upper surface, the lower surface, the first side surface and the second side surface that are positioned on one side of the gap in the longitudinal direction, and a fourth side surface that connects end portions of the upper surface, the lower surface, the first side surface and the second side surface that are positioned on the other side of the gap in the longitudinal direction;
the first side surface having an upper surface adjacent section that extends from the upper surface to the other side in the thickness direction, a step section that extends, from an end portion of the upper surface adjacent section that is positioned on the other side in the thickness direction, in a direction proximate to the second side surface, and a lower adjacent section that extends, from an end portion of the step section that is positioned on a side proximate to the second side surface, to the other side in the thickness direction to reach the lower surface;
the second side surface having an upper surface adjacent section that extends from the upper surface to the other side in the thickness direction, a step section that extends, from an end portion of upper surface adjacent section that is positioned on the other side in the thickness direction, in a direction proximate to the first side surface, and a lower surface adjacent section that extends, from an end portion of the step section that is positioned on a side proximate to the first side surface, to the other side in the thickness direction to reach the lower surface;
the upper surface laminated part having first and second busbar-side upper surface openings that respectively expose parts of the upper surfaces of the first and second busbars; and
the insulating resin layer having the gap filling part and the upper surface laminated part, and also having a side surface laminated part integrally formed with the upper surface laminated part in such a manner as to cover the side surfaces of the busbar connecting body while exposing the lower surfaces of the first and second busbars.

* * * * *